United States Patent [19]

Croughwell et al.

[11] Patent Number: 5,966,654
[45] Date of Patent: Oct. 12, 1999

[54] RECYCLABLE CELLULAR TELEPHONE AND METHOD AND APPARATUS FOR SUPPORTING THE USE OF A RECYCLABLE CELLULAR TELEPHONE WITHIN A CELLULAR TELEPHONE NETWORK ACTING AS A THEME PARK COMMUNICATOR/SCHEDULER

[75] Inventors: William J. Croughwell, Durham; William R. Osborn, Cary, both of N.C.

[73] Assignee: Ericsson Inc., Research Triangle Park, N.C.

[21] Appl. No.: 08/742,453

[22] Filed: Nov. 1, 1996

[51] Int. Cl.$^6$ .............................. H04Q 7/22; G06F 17/60
[52] U.S. Cl. ................... 455/414; 455/422; 340/825.28; 705/5
[58] Field of Search ................................... 455/414, 422, 455/556, 557; 705/5, 6; 340/825.28, 825.29

[56] References Cited

U.S. PATENT DOCUMENTS

| | | | |
|---|---|---|---|
| 4,845,740 | 7/1989 | Tokuyama et al. | 379/91 |
| 4,903,319 | 2/1990 | Kasai et al. | 455/33 |
| 4,951,308 | 8/1990 | Bishop et al. | 379/91 |
| 5,138,650 | 8/1992 | Stahl et al. | 379/61 |
| 5,301,223 | 4/1994 | Amadon et al. | 379/58 |
| 5,325,418 | 6/1994 | McGregor et al. | 379/59 |
| 5,353,335 | 10/1994 | D'Urso et al. | 379/67 |
| 5,523,737 | 6/1996 | Luna | 340/323 R |
| 5,577,100 | 11/1996 | McGregor et al. | 379/58 |
| 5,724,520 | 3/1998 | Goheen | 705/5 |

FOREIGN PATENT DOCUMENTS

| | | |
|---|---|---|
| 6-149816 | 5/1994 | Japan . |
| 08123862 | 5/1996 | Japan . |
| 2 262 685 | 6/1993 | United Kingdom . |
| WO 90 09002 | 8/1990 | WIPO . |
| WO 93/14571 | 7/1993 | WIPO . |
| WO 94/11835 | 5/1994 | WIPO . |
| WO 96/03001 | 2/1996 | WIPO . |

OTHER PUBLICATIONS

PCT Search Report, Jul. 27, 1998 PCT/US 97/19587.

*Primary Examiner*—Andrew M. Dolinar
*Attorney, Agent, or Firm*—Jenkens & Gilchrist, P.C.

[57] ABSTRACT

A recyclable cellular telephone is disclosed having an inner rigid cellular electronics supporting frame member surrounded by a replaceable outer cover. The telephone is acquired having a limited period of use. The electronics of the telephone operate to disable the telephone following expiration of the period of use. Following expiration of the period of use, the telephone is returned for refurbishment where the outer cover is stripped and replaced and the electronics tested before being recycled with a new period of use for an another acquisition. The cellular network supporting telephone operation also monitors the period of use, disabling telephone access to the network following expiration. Directory numbers are selectively assigned to the recyclable telephones from a pool of available numbers, with assigned numbers returned to the pool after expiration of a predetermined period or telephone deactivation for re-use by another recyclable telephone. The recyclable telephones are activated and deactivated in a number of ways, including through the use of a separate activation and deactivation station which communicates with the telephones over a radio frequency communications link.

12 Claims, 15 Drawing Sheets

RECYCLABLE CELLULAR TELEPHONE AND METHOD AND APPARATUS FOR SUPPORTING THE USE OF A RECYCLABLE CELLULAR TELEPHONE WITHIN A CELLULAR TELEPHONE NETWORK ACTING AS A THEME PARK COMMUNICATOR/SCHEDULER

CROSS-REFERENCE TO RELATED APPLICATIONS

The present application for patent is related to concurrently filed and commonly assigned U.S. patent applications Ser. No. 08/743,403, now U.S. Pat. No. 5,839,058, Ser. No. 08/742,048, Ser. No. 08/743,409, now U.S. Pat. No. 5,818,915, and Ser. No. 08/743,403, now U.S. Pat. No. 5,870,459, all filed Nov. 1,1996, all entitled. "RECYCLABLE CELLULAR TELEPHONE AND METHOD AND APPARATUS FOR SUPPORTING THE USE OF A RECYCLABLE CELLULAR TELEPHONE WITHIN A CELLULAR TELEPHONE NETWORK", these applications comprising Attorney Docket Nos. 27951-82, 27951-87, 27951-88, and 27951-98, respectively.

BACKGROUND OF THE INVENTION

1. Technical Field of the Invention

The present invention relates to cellular telephones and, in particular, to the provision and support of a recyclable cellular telephone for use within a cellular telephone network.

2. Description of Related Art

There often times exists a need for cellular telephone service for relatively short periods of time within a limited geographical area. One example of such a need arises during a family, or other group, visit to a theme or amusement park. During such visits, it is not unusual for individuals within the family or group to have different interests, want to see different events, or ride on different rides in the park. In order to meet everyone's needs, the groups often split up and later find it difficult to reestablish contact. Through use of cellular telephones, it is possible for separated families or groups to communicate with each other to solve the separation problem and coordinate joint activities. However, a deterrent to that solution is the need for at least two cellular telephones, i.e., one phone for each body of the group. Under current practices, each cellular telephone has its own service contract and expenses associated with the contract. Although one member of the family or group may already have a cellular telephone, there exists a need for temporary use of a second or third cellular telephone to meet the group needs.

In connection with such a visit to a theme or amusement park, many patrons experience the frustration associated with standing in line awaiting entry to a desired attaction. There would be an advantage if entry to particular desired attractions could be scheduled by a patron ahead of time. This would obviate the need to stand in line, and would further facilitate a more efficient enjoyable visit to the park. There is further a need to provide such a scheduling feature through the convenient use of a telecommunications network.

SUMMARY OF THE INVENTION

The present invention relates to the use of an economical disposable or reusable (recyclable) cellular telephone that is marketed to consumers (users) in much the same manner as disposable (one-time use) cameras. Such a telephone may be purchased at a theme park, amusement park, discount store, drug store, convenience store, grocery store, hotel or car rental agency, for example, and have limited features making it economical to produce, easy to use and affordable. The telephone is typically acquired with a restricted period of use during which it may make and perhaps receive cellular calls. The length of this period of use may be dictated by the amount of money spent by the purchaser in acquiring the telephone, with the use restriction based either on a predetermined length of "talk" time, the number of calls made or some other measurable event. Following expiration of the period of use, the recyclable cellular telephone is disabled from operation, and returned by the user, perhaps by mail, to a predetermined entity, and then refurbished for acquisition by a subsequent user. Alternatively, additional periods of use may be obtained for continued use of the telephone. The cost of the acquisition may include a security deposit, refunded to the user upon return of the telephone for refurbishment.

In one particular application, the recyclable cellular telephones are made available to persons for use within a limited geographic area comprising a theme or amusement park to engage in intra-park communications with other similarly equipped patrons. Communication using such telephone would be limited to within the confines of the park. The telephones could further be used by patrons to schedule admission to an event or ride through the use a human operator or an automated attendant communications system. Once scheduled, the system makes return reminder calls to the telephone of the patron at predetermined intervals before the scheduled admission time. At the particular event or ride, the telephone, through its assigned unique identification, is used to grant the carrying patron access at the scheduled time.

BRIEF DESCRIPTION OF THE DRAWINGS

A more complete understanding of the method and apparatus of the present invention may be obtained by reference to the following Detailed Description when taken in conjunction with the accompanying Drawings wherein.

DETAILED DESCRIPTION OF THE DRAWINGS

The present invention is described and illustrated herein with specific reference to a cellular telephone. The invention is not, however, limited in use only to cellular telephones but may equally well be used in connection with any other suitable type of telecommunications instrument. The description of the present invention with respect to a cellular telephone is accordingly to be taken as an illustration of, rather than a limitation on, the scope of the present invention.

Figure 1:
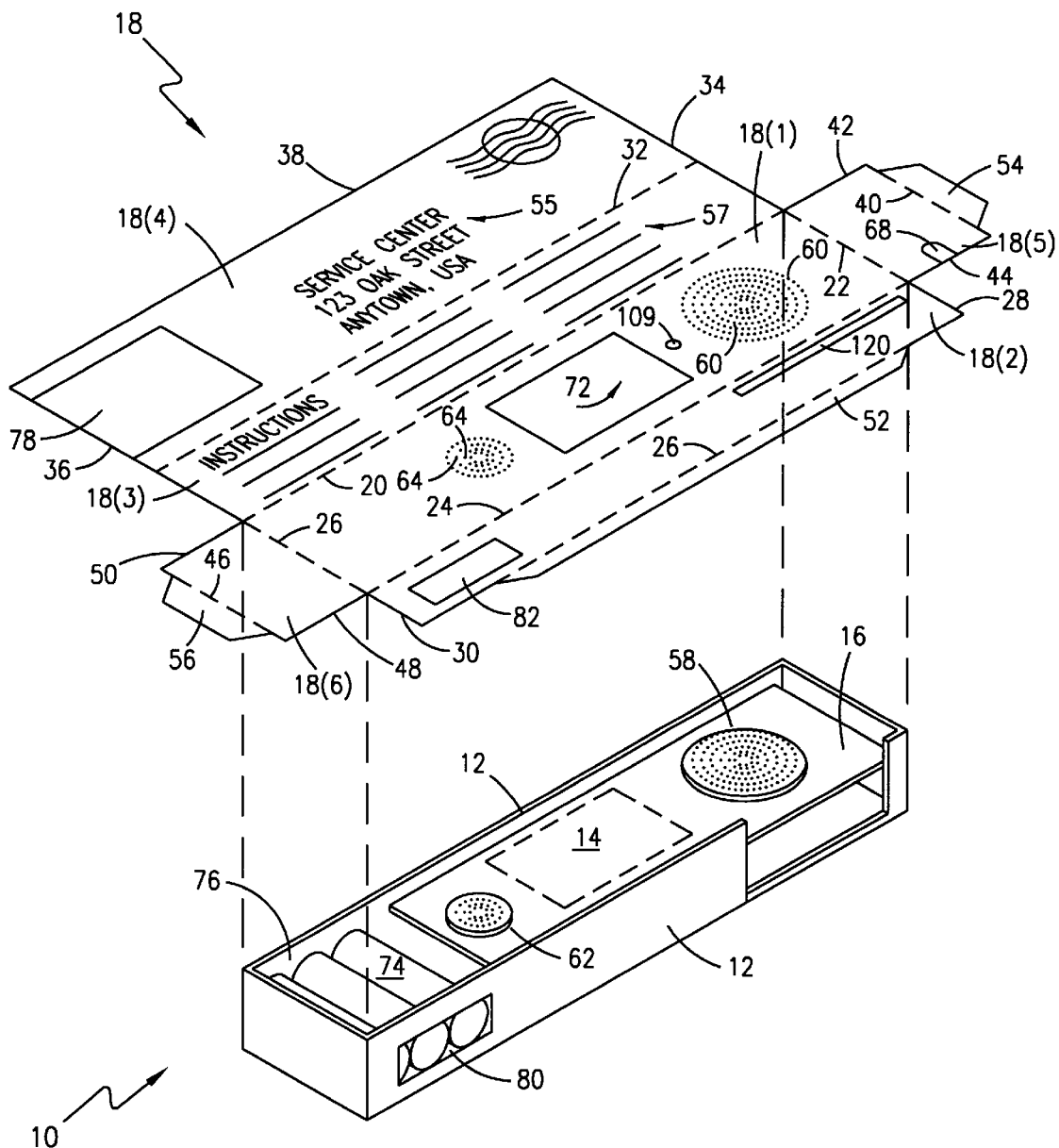
FIG. 1 is an exploded perspective view of a recyclable cellular telephone of the present invention.

Reference is now made to FIG. 1 wherein there is shown an exploded perspective view of an unassembled recyclable cellular telephone 10 embodying the present invention. The recyclable cellular phone 10 has an inner structural frame member 12 preferably formed of a rigid, impact resistant material. This rigid material for the frame member 12 may comprise an electrically conductive metallic material (for example, sheet metal), or an electrically conductive plastic material. Alternatively, the frame member 12 may be formed of a nonconductive material and plated or covered on selected surfaces with an electrically conductive coating. The frame member 12 not only protects but also preferably provides RF shielding for the included electrical circuits and components (generally but not exclusively indicated at 14) necessary to provide at least basic cellular telephone service. The circuits and components 14 are mounted to a support member 16, comprising a printed circuit board, flexfilm, flexstrip or other means for encapsulating the circuits and components, which is supported within and mounted to the frame member 12. If desired, the conductive frame member 12 may further be used as a ground for the circuits and components 14. In another embodiment, the frame 12 may itself comprise the support member 16 for the circuits and components 14.

The recyclable cellular telephone 10 further includes a disposable outer cover 18. The term "disposable" as used herein means that the thus identified component is designed to be used once for a limited period of time, as subsequently described, and then thrown away. Thus, the disposable component has negligible economic value after a certain limited period of use for the telephone. In the present invention, the disposable cover 18 may be formed of recyclable or non-recyclable material. Preferably, the disposable outer cover 18 is formed of plastic, cardboard, paper board, aluminum or heavy card stock having a weight of at least 50# or similar readily disposable flexible but still sturdy material. The selected sheet material may be electrically coated or made conductive to provide additional RF shielding. The outer cover 18 is preferably formed of one sheet of the selected material and is shaped and configured in such a manner as to be capable of being easily wrapped to surround and substantially enclose the frame member 12, the electrical circuits and components 14, and the printed circuit board 16. However, the outer cover 18, even when wrapped around the frame 12, is not attached to the frame 12 in order to facilitate easy removal and replacement. Thus, importantly, in marked contrast to superfluous packing and display material, the disposable cover 18 provides a contiguous, but separate, unattached covering about the frame 12 throughout the use of the telephone 10.

In other embodiments of the telecommunication instrument embodying the present invention, the frame 12 may comprise separable support and shell members that are assembled together to form the body of the instrument. In those arrangements, the assembled body may be enclosed by a disposable cover 18, as described above, or comprise a conventional frame and shell assembly without a separate cover. In the later arrangement, appropriate labels for product marking, address identification and other information, as described below in more detail, may be affixed directly to an outer surface of the shell.

The outer cover 18 in one embodiment may include: a first portion 18(1) whose outer perimeter is defined by four fold lines 20, 22, 24 and 26 (where all fold lines are illustrated as broken lines); a second portion 18(2) whose outer perimeter is defined by fold lines 24 and 26 and cover edges 28 and 30; a third portion 18(3) whose outer perimeter is defined by fold lines 20 and 32 and cover edges 34 and 36; a fourth portion 18(4) whose outer perimeter is defined by fold line 32 and cover edges 34, 36 and 38; a fifth portion 18(5) whose outer perimeter is defined by fold lines 22 and 40 and cover edges 42 and 44; and, a sixth portion 18(6) whose outer perimeter is defined by fold lines 26 and 46 and cover edges 48 and 50. The first portion 18 (1) is positioned during assembly of the recyclable cellular telephone 10 to provide a front surface for the telephone. Bending of the cover 18 along fold lines 20 and 24 positions the second and third portions 18(2) and 18(3) to comprise the right and left surfaces, respectively, of the telephone 10. Bending of the cover 18 along fold line 32 positions the fourth portion 18(4) to provide a back surface of the telephone 10. Finally, bending of the cover 18 along fold lines 22 and 26 positions the fifth and sixth portions 18(5) and 18(6) to provide the top and bottom surfaces, respectively, for the telephone 10.

Figure 2A:
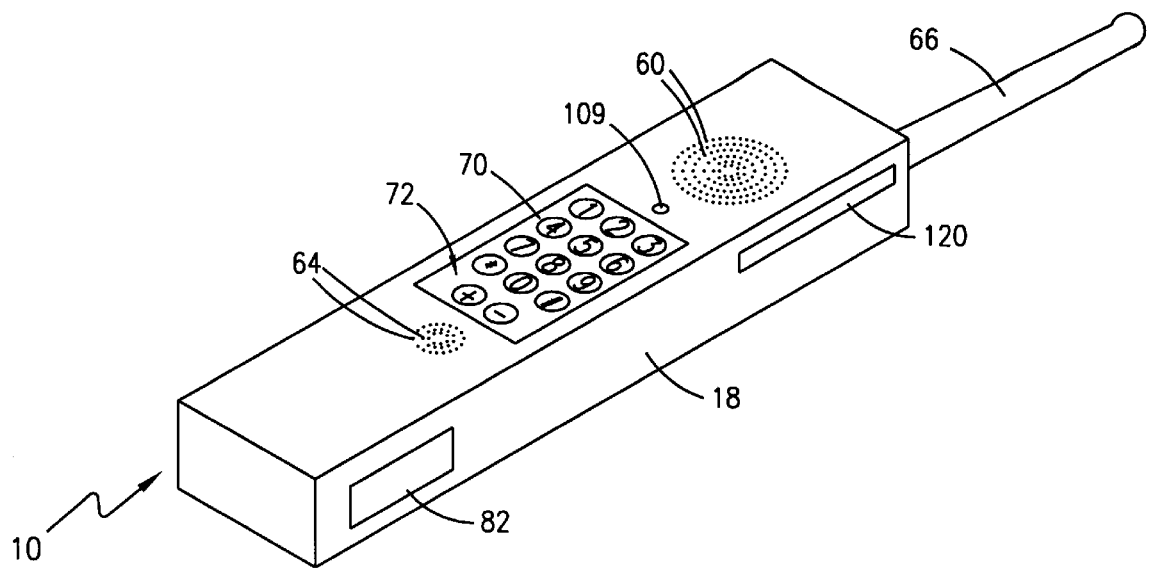
FIG. 2A is an assembled perspective view of the recyclable cellular telephone shown in FIG. 1.

The outer cover 18 may further include: a first tab 52 adjacent fold line 26 of the second portion 18(2); a second tab 54 adjacent fold line 22 of the fifth portion 18(5); and, a third tab 56 adjacent fold line 46 of the sixth portion 18(6). To complete assembly of the recyclable cellular telephone 10, the cover 18 is bent along fold line 26 and first tab 52 is secured by adhesive or other bonding means to fourth portion 18(4) along edge 38. Also, the cover 18 is bent along fold lines 40 and 46 allowing second and third tabs 54 and 56 to be secured by adhesive or other bonding means to fourth portion 18(4) along edges 34 and 36, respectively. The assembled recyclable cellular telephone 10 in accordance with this embodiment is illustrated in FIG. 2A.

In certain applications, such as with respect to use in theme parks, amusement parks or other special events, the disposable cover 18 may be advantageously shaped or otherwise configured to identify the associated park or event. For example, the cover 18 may be configured to simulate features of cartoon character or team mascot.

It is envisioned that the recyclable cellular telephone 10 of the present invention will be marketed for user acquisition as a multi-user, re-usable device having a limited period of use (per user) and limited functional characteristics. The absence of many functionalities other than those necessary to provide basic cellular telephone service allows for the telephone 10 to be produced at a reduced cost. Following acquisition and completed use of the recyclable cellular telephone 10 by a user, the telephone is returned to a central location, comprising a service center or other designated destination, and refurbished for subsequent acquisition by another user. Return is accomplished by mailing to the service center, with the outer cover 18 of the recyclable cellular telephone 10 serving as the mailer, and the cover further including a preaddressed mailing label with postage prepaid (generally indicated at 55). The outer cover 18 should then accordingly be made of sufficiently strong sheet material to protect the frame member 12, the electrical circuits and components 14, and the printed circuit board 16 during mailing. The outer cover 18 further is printed with instructions for use of the telephone (activation, operation and deactivation), and any relevant warranty, licensing and origin of manufacture information (all generally indicated at 57). Once the recyclable cellular telephone 10 is returned to the service center, the existing outer cover 18, which may have been damaged or despoiled by the prior user, is removed and discarded, the telephone electronics and structure are serviced as necessary, and a new outer cover is installed. The use of a single sheet of the selected material for the outer cover 18 makes re-assembly of the cellular telephone 10 in connection with this refurbishment process relatively inexpensive, simple and easy to accomplish.

In other embodiments in which the cellular telephone 10 includes interconnected frame and shell components, or other arrangements that do not include a disposable cover, the mailing address, use or operating instructions, warranty, origin of manufacture or other informational labels may be attached directly to an outer surface of the shell. In such arrangements, old labels that are no longer serviceable may be stripped during the refurbishment process and replaced with new labels.

Figure 2B:
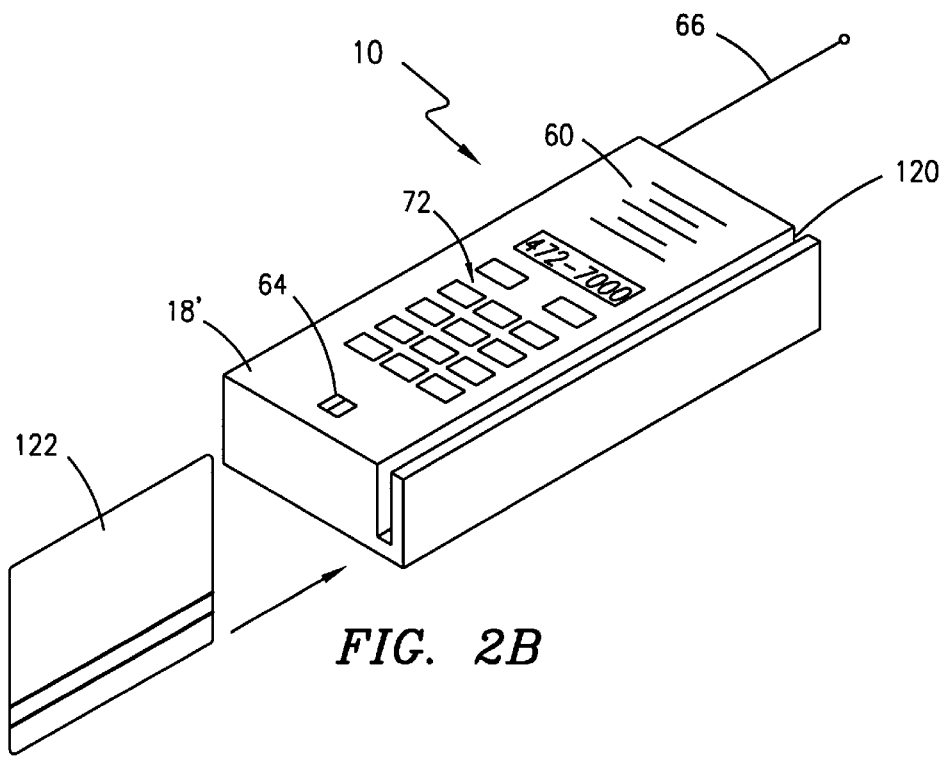
FIG. 2B is a perspective view of an alternative recyclable cellular telephone of the present invention.

Also, there may exist other instances of acquisition where it is unlikely that the recyclable cellular telephone 10 will have a substantial number of short in time, separate uses. This may occur, for example, with respect to telephones 10 possessing more than just basic cellular service access, and telephones acquired for long term possession as safety or security devices. In these cases the outer cover 18 of sheet material may instead comprise a molded plastic cover 18' similar to that used for conventional cellular telephones. Pre-addressing and guaranteed postage for returning the telephone are still, however, included in the event return of the telephone becomes necessary. A telephone having this configuration is shown in FIG. 2B.

The circuits and components 14 of the recyclable cellular telephone 10 include a speaker 58 mounted to the circuit board 16. A plurality of small openings 60 are provided in the first portion 18(1) of the outer cover 18 comprising the front of the telephone 10 to facilitate the passage of audible sounds output from the speaker 58. The openings 60 are positioned on the cover 18 or 18' to be substantially aligned with the position of the speaker 58 when the telephone 10 is assembled (see, FIGS. 2A and 2B).

The circuits and components 14 of the recyclable cellular telephone 10 further include a microphone 62 mounted to the circuit board 16. Again, a plurality of small openings 64 are provided in the first portion 18(1) of the outer cover 18 comprising the front of the telephone 10 to facilitate the passage of audible sounds input to the microphone 62. The openings 64 are positioned on the cover 18 or 181 to be substantially aligned with the position of the microphone 62 when the telephone 10 is assembled (see, FIGS. 2A and 2B).

The circuits and components 14 of the recyclable cellular telephone 10 still further include an antenna 66 (see, FIGS. 2A and 2B) mounted to the frame member 12 and electrically connected to the circuit board 16. In the embodiment of FIG. 1, an opening 68 is provided in the fifth portion 18(5) of the outer cover 18 along edge 44 through which the antenna 66 may project. A similar opening is positioned in the cover 18' for the embodiment of FIG. 2B. It will, of course, be understood that alternatively antenna 66 may be enclosed entirely within the cover 18 or 18' obviating the need for opening 68.

The circuits and components 14 of the recyclable cellular telephone 10 also include a keypad 70 (see, FIGS. 2A and 2B) mounted to the circuit board 16. The keypad 70 may comprise any one of a number of known keypad types including: a touch sensitive membrane keypad; a touch sensitive LCD screen; or, a keypad comprising a plurality of individually operable keys each of which provide a tactile feedback to the user. In the embodiment of FIG. 1, the first portion 18(1) of the outer cover 18 comprising the front of the telephone 10 includes an opening 72 to facilitate user access to the included keypad 70. The opening 72 is accordingly positioned on the cover 18 to be substantially aligned with the position of the keypad 70 when the telephone 10 is assembled (see, FIG. 2A). A similar opening is positioned in the cover 18' for the embodiment of FIG. 2B. With respect to the use of a touch sensitive membrane keypad, in particular, or any other keypad type in general, a transparent flexible film may extend over the opening 72, with the film providing a printed overlay of the key arrangement. The film provides additional protection to the circuits and components 14 during telephone use and return for refurbishment. Alternatively, a plurality of openings 72, one for each individual key in the keypad 70, are provided in the cover 18 or 18' (as is shown in FIG. 2B).

The recyclable cellular telephone 10 further includes a source of electrical power comprising one or more batteries 74 housed within the frame member 12 and electrically connected to the circuits and components 14 of the circuit board 16. These batteries may comprise conventional alkaline type batteries (for example, AAA size), or may comprise rechargeable batteries (for example, NiCad). It is not envisioned that conventional operation of the recyclable cellular telephone 10 will require user replacement of the batteries 74. Accordingly, the outer cover 18 or 18' does not include an opening therein to provide user access to the battery housing 76. Access to the batteries 74 preferably is made only during the refurbishment process when the cover 18 or 18' is removed for replacement. However, in some instances, user replacement of the batteries 74 may not only be required, but be encouraged, and to accommodate this the fourth portion 18(4) of the cover 18 in the embodiment of FIG. 1 includes an opening or flap 78 through which an user may access the battery housing 76 when needed to replace the batteries. Appropriate means (not shown) is provided for securing the flap 78 following battery replacement. The flap 78 is also used in those instances where user installation of the batteries 74 upon telephone acquisition is required. A similar opening is positioned in the cover 18' for the embodiment of FIG. 2B.

In yet another embodiment, the recyclable cellular telephone 10 may comprise an assembly of electronic and mechanical modules as described in concurrently filed and commonly assigned U.S. application for patent Ser. No. 08/740,781, filed Nov. 1, 1996, now U.S. Pat. No. 5,832, 371. entitled "MODULAR PHONE CONSTRUCTION", Attorney Docket No. 27951-117. In this arrangement, selected or faulty modular components may be replaced in the course of recycling the phone for additional limited use.

In accordance with current Federal Communications Commission (FCC) regulations, telecommunications instruments in general, and cellular telephones in particular, must be assigned an identification number that is unique to a specific instrument. Typically, this identification number is placed on an outer surface of the cover for a cellular telephone. In effectuating the marketing and sale of the recyclable cellular telephone 10 of the present invention for multiple re-uses, however, the outer cover 18 is destroyed and replaced with each refurbishment process. It would be inefficient to reprint the unique FCC assigned identification number for the telephone 10 on the newly installed cover 18 with each instance of refurbishment. Instead, the FCC assigned identification number, or other identification number typically assigned by a governmental entity, is printed on a label which is permanently affixed to the frame member 12 at a location 80.

It is a further FCC regulation that this assigned identification number be readily visible on the instrument itself. To accommodate that requirement with respect to the recyclable cellular telephone 10, the outer cover 18 or 18' includes an opening 82 therein (shown, for example, in second portion 18(2) of FIGS. 1 and 2A), aligned with the location 80 of the label when the telephone 10 is assembled. Through this opening 82, the label with the FCC assigned or other identification number is always visible. As an alternative, the identification number or other identifying indicia may instead be printed or engraved directly on the frame member 12 itself at the location 80. The opening 82 is still provided in the outer cover 18 and positioned is alignment with the location 80 on the frame member 12 of the printed or engraved identification number.

Figure 3:
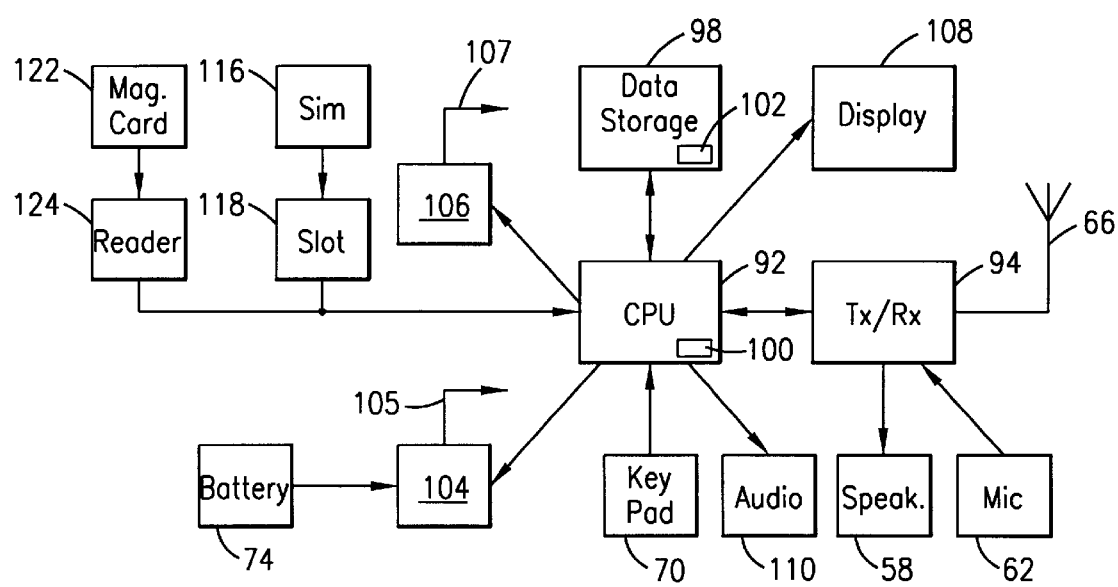
FIG. 3 is a block diagram of the recyclable cellular telephone of the present invention.

Reference is now made to FIG. 3 wherein there is shown a block diagram of the circuits and components 14 for the recyclable cellular telephone 10 of the present invention. The recyclable cellular telephone 10 includes a processor (CPU) 92 connected to a transceiver 94 operable on a number of different channels of a particular cellular telephone network air interface. An output signal from the processor 92 selects the channel on which the transceiver 94 operates for communication over the air interface 14. The antenna 66 is connected to the transceiver 94 for transmitting and receiving radio communications to and from a base station of the cellular telephone network. The recyclable cellular telephone 10 includes the hardware and software necessary to effectuate communications within a particular one or one of: an Advanced Mobile Phone System (AMPS) cellular network, a digital AMPS cellular network, a Global System for Mobile (GSM) cellular communications network, or a Personal Communications Service (PCS) cellular network, as desired or appropriate for the geographic area within which the telephone is marketed. A data storage device 98 (preferably in the form of a read only memory—ROM—and a random access memory—RAM) is also connected to the processor 92. The processing unit 92 and data storage device 98 are preferably implemented in an application specific integrated circuit (ASIC) designed such that all memory operations are internal to the chip and cannot be monitored external to the chip or modified without using proprietary processor requests. The data storage device 98 is used for storing programs and data executed by the processor 92 in controlling operation of the cellular telephone 10 to implement conventional mobile station operations and functions well known to those skilled in the art, as well as the functions concerning telephone period of use limitations (to be described herein) with respect to recyclable cellular telephones of the present invention. The microphone 62 and speaker 58 for the recyclable cellular telephone 10 are connected to the transceiver 94 for facilitating telephonic voice communications. The keypad 70 for the recyclable cellular telephone 10, through which entry of cellular telephone 10 operation commands is made, is connected to the processor 92.

The recyclable cellular telephone 10 is intended to be marketed for multi-user acquisition as a limited use cellular telephone instrument. Limited use in this regard refers to both service features and actual telephonic period of use. With respect to service features, the well known subscriber comfort service features, such as a dialing directory, visual display, call forwarding, call waiting, and voice mail, may not be offered to persons using the recyclable cellular telephone 10. Instead, the user is offered the plain telephonic voice services of call origination and perhaps call reception. With respect to actual telephonic period of use, the user is limited in terms of the length of time the telephone is in use (during a call) and/or the number of measurable events occurring for that telephone (such as an originating or terminating call). Once the limitation on period of use is exceeded, the cellular telephone 10 becomes inoperable in the sense either that it ceases to function properly or the network fails to recognize its existence. At this point in time, the user may either return the telephone for refurbishment as described above or, if available, make arrangements following an appropriate payment to acquire an additional period of use.

Figure 4A:
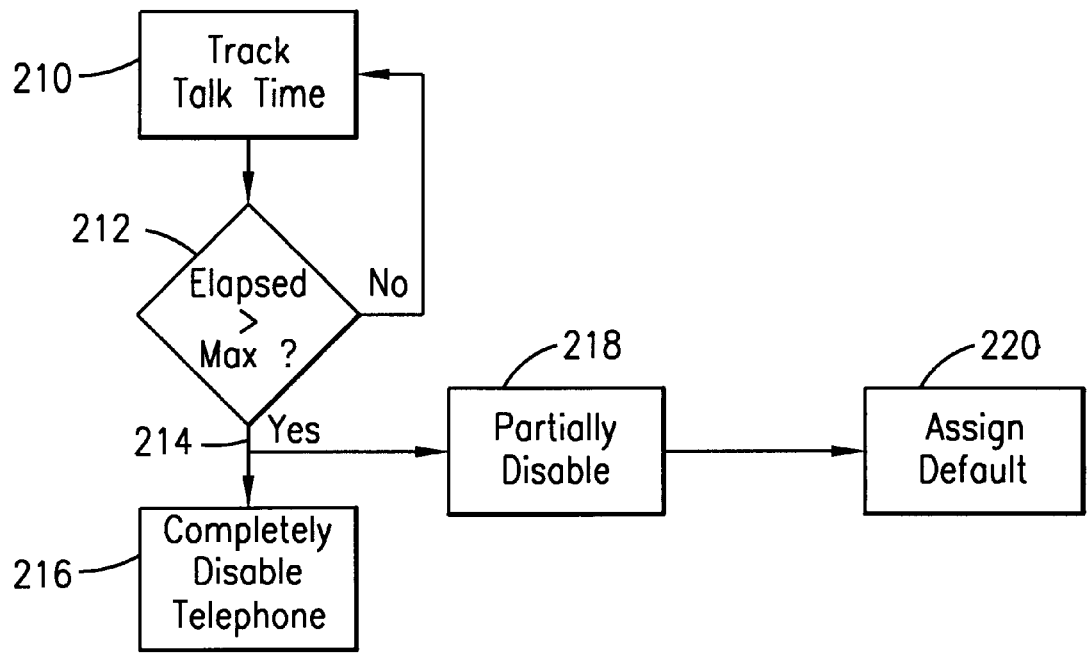
FIG. 4A is a flow diagram illustrating operation of the recyclable cellular telephone in self-monitoring for the expiration of a pre-set talk-time period of use.

Control over the operation of the recyclable cellular telephone 10 with respect to the period of use may be accomplished either through the telephone itself or through the network over which cellular telephone service is provided. Turning first to the recyclable cellular telephone 10 itself (network monitoring is described below), in one embodiment the central processor 92 includes a timer 100 used to track the amount of time that the cellular telephone is actually engaged in a cellular calling (originating and/or terminating) mode of operation (i.e., talk time). A maximum time limit is preprogrammed and stored in the data storage device 98, or alternatively is loaded into the data storage device at the time of acquisition. The central processor 92 monitors the elapsed calling time reflected by the timer 100, and when the elapsed time exceeds the stored maximum time, further operation of the cellular telephone 10 is disabled. A flow diagram illustrating operation of the recyclable cellular telephone 10 in self-monitoring for the expiration of the pre-set talk-time period of use is shown in FIG. 4A (and described in more detail later).

Figure 5A:
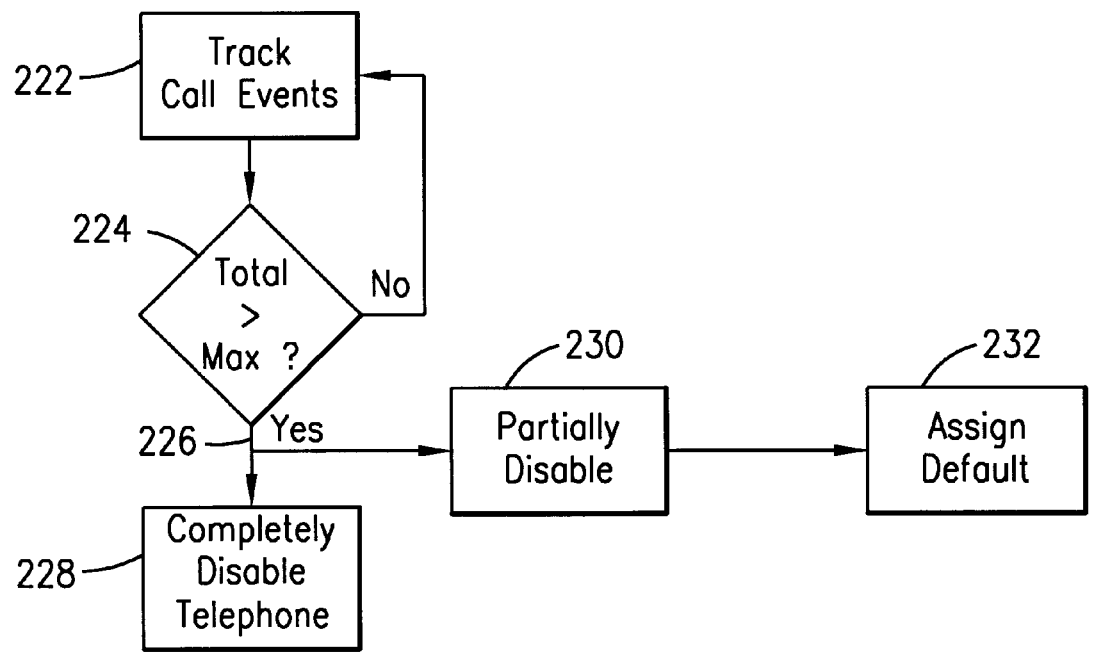
FIG. 5A is a flow diagram illustrating operation of the recyclable cellular telephone in self-monitoring for the expiration of a pre-set calling event period of use.

In another embodiment, a counter 102 is maintained in the data storage device 98 reflecting the number of measurable events which occur with respect to the recyclable cellular telephone 10. Such events may comprise the origination and/or reception of a cellular telephone call. With each event occurrence, the central processor 92 increments the counter 102. A maximum number of events is preprogrammed and stored in the data storage device 98, or alternatively is loaded into the data storage device at the time of acquisition. The central processor 92 monitors the total number of events reflected by the counter 102, and when the total number of events exceeds the stored maximum number of events, further operation of the recyclable cellular telephone 10 is disabled. A flow diagram illustrating operation of the recyclable cellular telephone 10 in self-monitoring for the expiration of the pre-set calling event period of use is shown in FIG. 5A (and described in more detail later).

Central processor 92 disabling of recyclable cellular telephone 10 operation following expiration of the period of use may be accomplished in a number of ways. It is important, however, that regardless of the way chosen, that a sufficient barrier be established against user tampering in an attempt to enable fraudulent calling. In a first embodiment, the central processor 92 responds to a disablement by merely ignoring signals from the keypad 70 with respect to originating calls, and ignores signals (such as pages) from the cellular telephone network with respect to receiving calls. This may be accomplished by altering bits in the data storage device 98 which specify central processor 92 operation and indicate the operational status of the telephone (i.e., ready for activation, activated, and deactivated). In another embodiment, the central processor 92 responds to a disablement indication by intentionally failing attempts by the telephone to authenticate itself with the network. In yet another embodiment, the central processor 92 responds to a disablement indication by instructing a device 104 to interrupt the supply of power 105 from the batteries 74 to the circuits and components 14 of the cellular telephone 10. Preferably, device 104 would effectuate a permanent interruption of the supply of power to such a degree as to require the user of the cellular telephone 10 to return the unit for refurbishment. In yet another embodiment, the central processor 92 responds to a disablement by erasing important cellular telephone 10 operational data and/or programming from the data storage device 98. Preferably, the erasure of the operational data and/or programming would be of such a degree as to require the user of the recyclable cellular telephone 10 to return the unit for refurbishment. In this regard, physical and technological barriers (such as the use of an ASIC with proprietary signaling as described above) may be established to prevent unauthorized user access to the data stored in the data storage device 98. In another embodiment, the central processor 92 responds to a disablement by instructing a device 106 to physically damage or destroy 107 part of the circuits and components 14 of the recyclable cellular telephone 10. For example, device 106 may cause a voltage surge in excess of voltage breakdown to be applied to certain semiconductor circuits within the telephone 10. Alternatively, device 106 could apply a force (through a motor or solenoid) to physically crush or damage an integrated circuit.

Because the cellular telephone 10 comprises a limited period of use instrument, it is important that some feedback be given to the user as to whether the telephone is enabled for or has been disabled from operation. In one embodiment, the cellular telephone 10 includes a visual display device 108, comprising perhaps an individual light emitting diode, an LCD or an LED display, connected to the central processor 92. With reference again to FIG. 1, the first portion 18(1) of the outer cover 18 comprising the front of the telephone 10 includes an opening 109 (illustrated for an individual light emitting diode) through which the visual display device 108 may extend after assembly and be perceived. The opening 109 is positioned on the cover 18 to be substantially aligned with the position of the visual display device 108 when the telephone 10 is assembled. In another embodiment, the recyclable cellular telephone 10 includes an audible indication device 110, comprising perhaps a voice synthesizer, connected to both the processor 92 and speaker 58. The voice synthesizer receives textual messages from the processor 92 (indicative of cellular telephone 10 state of operation), and in response thereto performs a text-to-voice translation generating corresponding audible messages for delivery to the user using the speaker 58. Alternatively, the device 110 generates a specific periodic tone (like a particular beeping pattern) in response to any keypad 70 depression by the user indicating that the permitted period of use has expired and the cellular telephone 10 has been disabled from operation.

Recent advances in cellular telephone technology involve the assignment of subscriber identity module (SIM) cards to subscribers with respect to their associated cellular subscriptions. These SIM cards are programmed with service information unique to the subscriber, and may be inserted into any supporting cellular telephone to enable subscriber use of that telephone, and access to appropriate service features, in connection with the making and receiving of cellular calls. These SIM cards are currently used in PCS and GSM type cellular telephone networks.

The recyclable cellular telephone 10 of the present invention in a more enhanced embodiment supports the use of a SIM card 116 owned by an acquiring user by including a SIM card slot 118 mounted to the circuit board 16 and electrically connected to the processing unit 92. With additional reference again to FIG. 1, the second portion 18(2) of the outer cover 18 comprising the right side of the telephone 10 includes an opening 120 to facilitate user insertion and removal of a SIM card 116. One benefit of supporting SIM card 116 use is that an existing subscriber to cellular telephone service may use their SIM card (removed from another cellular telephone device) in an acquired recyclable cellular telephone 10. Such an acquisition may occur when the user's own cellular telephone is unavailable for use (perhaps when traveling in an incompatible service area).

As an alternative, or perhaps in addition, the recyclable cellular telephone 10, also in a more enhanced embodiment, supports the reading of magnetic cards 122 inserted by a purchasing user by including a magnetic stripe reader 124 mounted to the circuit board 16 and electrically connected to the processing unit 92. With additional reference again to FIG. 1, the opening 120 in the second portion 18(2) of the outer cover 18 facilitates user insertion and removal of a magnetic card 122. An alternative position for the opening 120 in the cover 18' is illustrated in FIG. 2B. It will, of course, be understood that when both SIM card 116 and magnetic card 122 use is supported, more than one opening 120 may be needed. One benefit of supporting magnetic card 122 use is that a user may have important information stored on the magnetic card to be read into and stored by the cellular telephone 10. For example, the magnetic card may store an account balance with respect to pre-paid cellular telephone service. This information may then be loaded into the data storage device 98 to alter the stored maximum time and stored maximum number of events which define the permitted period of use for the cellular telephone 10. In another example, the magnetic card 122 may comprise a credit card which is read in connection with the purchase of additional periods of use for the cellular telephone 10.

A recyclable cellular telephone 10 as described herein presents a number of advantages. First, for persons desiring to have access to the convenience of cellular service, but not desiring the financial and time commitment required for entering into a conventional service subscription agreement, the recyclable cellular telephone 10 provides an attractive alternative. The user need only commit to the acquisition cost of the telephone 10, which includes a preset period of use (for example, talk-time), and in addition pay a refundable deposit. When the user finishes use of the telephone 10, it is easily returned to the seller or to a refurbishment center using the postage pre-paid mailer comprising the outer cover 18. The user is then refunded their deposit (by mail or by credit applied to a charge card). Alternatively, the used telephone may be exchanged at a participating retailer without payment of an additional deposit for another recyclable telephone.

The recyclable cellular telephone 10 has been described herein to potentially include a number of features. It will, of course, be understood that each of these features need not be included in the product marketed and acquired by a user. Thus, the telephone 10 need only include in a base model the circuits and components 14 required for basic cellular voice calling service. In fact, such a base model in its most restrictive operational form may only allow outgoing calls. By not including additional features such as a textual type visual display device 108, audible indication device 110, SIM card slot 118 and/or magnetic stripe reader 124, the cost of producing the telephone 10 is substantially reduced. Thus, with mass production efficiencies, the production and acquisition cost for a base model telephone 10 could be reduced to a level which would encourage impulse purchases in a manner similar to that experienced with disposable (single use) cameras. These base model telephones 10 would be the most likely candidates for frequent turnaround and refurbishment, and would be sold primarily to vacationers and for use as security or emergency calling devices. Higher model telephones 10 could also be manufactured including more features and sold at a higher price point to purchasers on a more or less permanent basis (i.e., there would little to no, or perhaps very infrequent, instances of turnaround and refurbishment). These higher model telephones would likely be purchased by persons desiring more consistent access to cellular service, but unwilling to enter into a long term cellular service subscription agreement. The telephones would also include the necessary features which allow for the subsequent purchase of additional periods of use (i.e., talk-time) without requiring a return and refurbishment of the telephone. A molded plastic cover 18' of FIG. 2B, rather than the cover 18 (shown in FIGS. 1 and 2A), could instead be used to make the telephone more attractive for semi-permanent acquisition.

Figure 6:
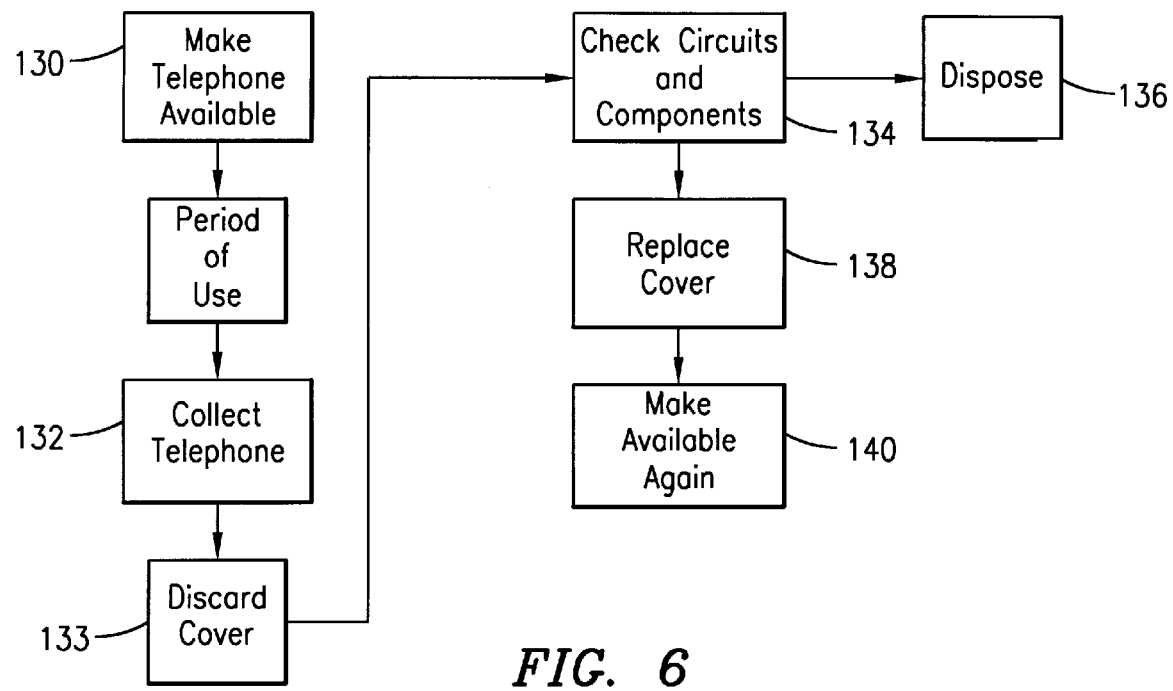
FIG. 6 is a flow diagram for a recyclable cellular telephone method of the present invention.

Reference is now made to FIG. 6 wherein there is shown a flow diagram for a recyclable cellular telephone method of the present invention. In step 130, a limited use recyclable cellular telephone is made available to potential users for acquisition. By limited use, it is meant that the telephone has a restricted period of use comprising, for example, a limited amount of talk time. The acquisition of the telephone by a user may occur in connection with a sale, lease or give-away of the cellular telephone. Acquisition of the telephone includes activation of the telephone for use. Next, in step 132, the limited use cellular telephone is collected following the termination of its use. The collected limited use cellular telephone is then refurbished. This refurbishment includes discarding the used cover (step 133) and checking (or testing) the electrical circuits and components to insure proper operation (step 134). For example, the battery, antenna or some other component may need to be replaced and the included software re-set. If the checking step is failed, and repair is not an option, the cellular telephone is disposed of in step 136. The refurbishment process still further includes the step of replacing the outer cover of the telephone (step 138). Once refurbishment is completed, the cellular telephone is again made available in step 140 for subsequent acquisition by another user.

The method for recycling a telecommunications instrument in accordance with the present invention may also include one or more incentives for the user to return the telephone after use. For example, an initial deposit may be required at the time of acquisition which is returned to the user upon return of the instrument. Also, discounts on future use and the avoidance of future billings may also be offered as incentives for return. Still further incentives may include returning the instrument to a restaurant, acting as an intermediate collection point, in return for discounts or free food items. Entry in a sweepstakes drawing for free travel, cash, or other prizes, may also be offered as an incentive to return the instrument after the defined limited period of use.

At manufacture, all of the recyclable cellular telephones 10 of the present invention are assigned a unique electronic serial number (ESN) in a manner similar to that done with respect to conventional cellular telephones. In order for the cellular telephone 10 to be able to receive, as well as to make, telephone calls, a directory number (for example, a mobile identification number) must be assigned to the telephone and associated with its electronic serial number. Once assigned, a calling party desiring to contact a user of a recyclable cellular telephone 10 need only then dial its assigned directory number. In an operation well known to those skilled in the art, the cellular network processes the dialed directory to identify its associated electronic serial number, and then pages for the called cellular telephone.

Figure 7A:
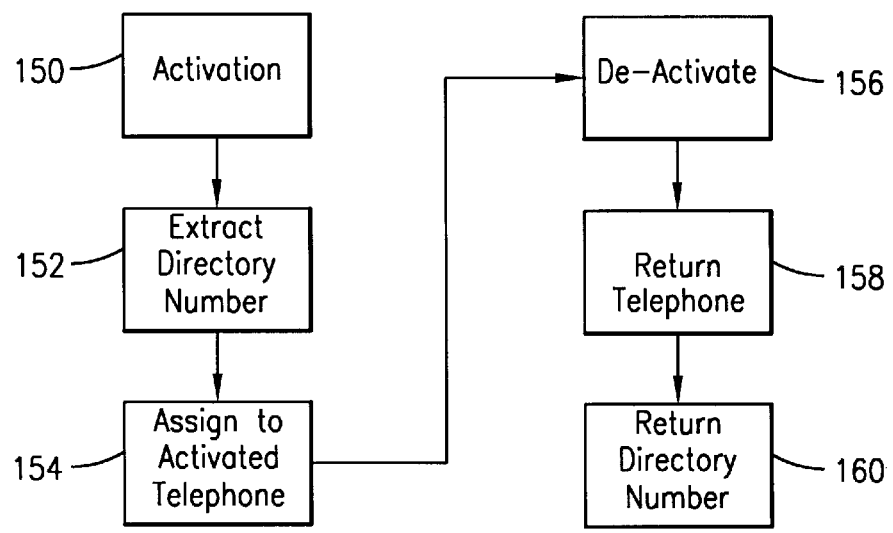
FIGS. 7A, 7B and 7C are flow diagrams for methods used to assign directory numbers to recyclable cellular telephones.
Figure 7B:
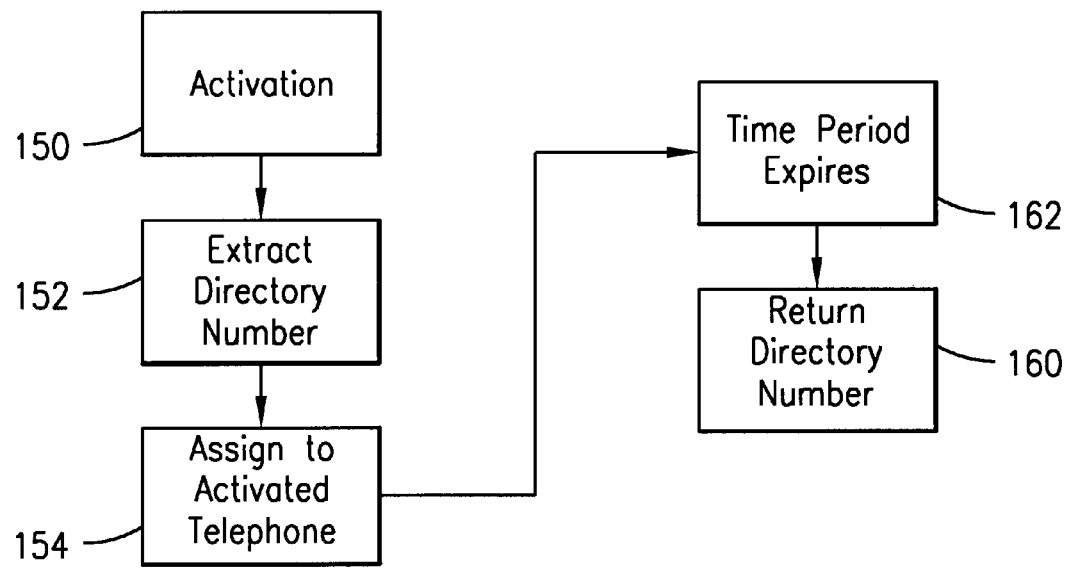
Figure 7C:
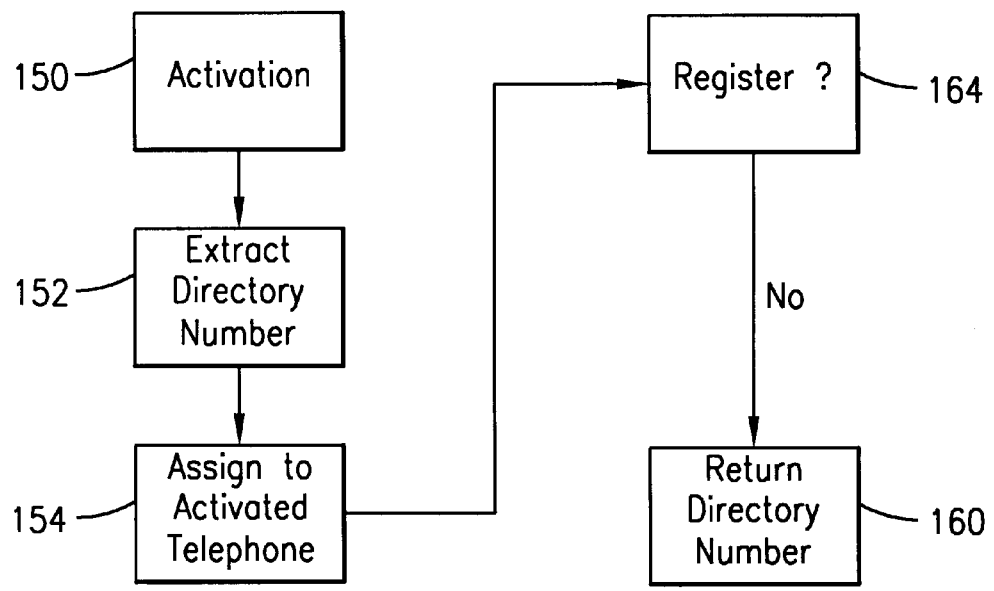

Reference is now made to FIGS. 7A, 7B and 7C wherein there are shown flow diagrams for methods used to assign directory numbers to recyclable cellular telephones 10. During manufacture, each recyclable cellular telephone 10 is assigned a unique electronic serial number. At activation of the cellular telephone 10 (step 150), an available one of a pooled plurality of directory numbers is extracted (step 152) and assigned (step 154) to the activated cellular telephone. Once extracted from the pool, the directory number is no longer available to be assigned to another cellular telephone. For so long as the number remains assigned, the telephone 10 may be used to both make and receive calls.

With specific reference now to FIG. 7A, when the cellular telephone is deactivated (step 156), possibly in conjunction with the return (step 158) of the telephone to be refurbished, the directory number previously assigned to that telephone is returned (step 160) to the pool and made available for subsequent re-assignment to another cellular telephone. In an alternative embodiment shown in FIG. 7B, the assignment of a directory number to the telephone (step 154) is temporary in nature lasting only for a predetermined period of time (perhaps, a month). When the predetermined period of time expires (step 162), regardless of telephone return, the assigned directory number is returned (step 160) to the pool and made available for subsequent assignment to another telephone. From that point in time on (typically until the telephone is returned for refurbishment), the telephone may only be used to make calls. In another embodiment shown in FIG. 7C, the assignment of a directory number to the telephone (step 154) is again temporary in nature. Maintenance of this assignment is dependent upon continued use of the telephone by the user. If the telephone fails within a predetermined period time after its last registration to again register with the serving cellular network (step 164), the assigned directory number is returned (step 160) to the pool and made available for subsequent assignment to another telephone. From that point in time on (typically until the telephone is returned for refurbishment), the telephone may only be used to make calls. In this embodiment, provided the telephone periodically registers within the predetermined period of time, the assigned directory number is maintained, and the telephone may be used to both make and receive calls.

Figure 8:
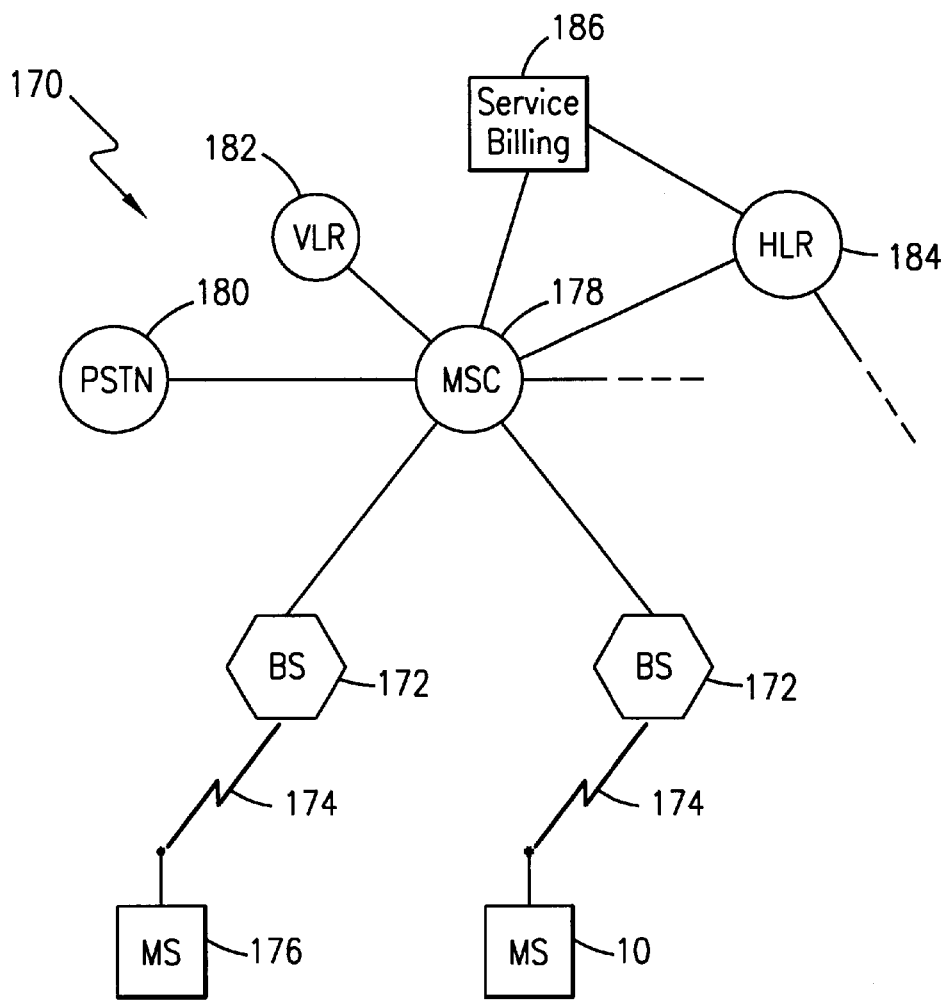
FIG. 8 is a block diagram of a cellular telephone network supporting operation of recyclable cellular telephones.

Reference is now made to FIG. 8 wherein there is shown a block diagram of a cellular telephone network 170 supporting operation of recyclable cellular telephones 10. The network 170 includes a plurality of base stations (BS) 172 (only two shown) for effectuating radio frequency communications over an air interface 174 with proximately located conventional mobile stations 176 as well as proximately located recyclable cellular telephones 10. Each base station 172 is connected through a mobile switching center (MSC) 178 to other mobile switching centers (not shown) within the cellular network 170, with at least one of the mobile switching centers connected to a fixed telephone network 180 (comprising a public switched telephone network (PSTN) or other equivalent telephone network).

The network 170 maintains a record in a visitor location register 182 accompanying each mobile switching center 178 (in addition to that maintained in the network home location register 184) of mobile station 176 and recyclable cellular telephone 10 service features, operating parameters and location. Each mobile switching center 178 operates to control associated base station 172 operation. The mobile switching centers 178 further switch within the network 170, and with the fixed telephone network 180, cellular telephone calls originated by or terminated at either the mobile stations 176 or recyclable cellular telephones 10. Operation of the network 170 in this fashion is well known to those skilled in the art, and thus further description will not be provided.

While the cellular telephone network 170 is illustrated as having only two base stations 172, it will, of course, be understood that such a network 170 would typically include many more base stations, and that the depiction of only two base stations is to be taken as an illustration of, rather than a limitation on, the operation of the present invention. It will further be understood that cellular telephone networks like the network 170 typically include far more than a single mobile station 176 or recyclable cellular telephone 10 operating within the network 170 at any one time. The depiction of only one mobile station 176 or recyclable cellular telephone 10 then is to be taken as an illustration of, rather than a limitation on, the operation of the present invention. Finally, although only one mobile switching center 178 is shown to simplify the illustration, it will be understood that the network 10 typically will include many mobile switching centers interconnected to each other (perhaps through the fixed telephone network 180), with each mobile switching center being connected to a plurality of base stations 172.

The home location register 184, or perhaps another adjunct data base (not shown) within a customer service and billing center 186, stores the pooled plurality of directory numbers for assignment to activated recyclable cellular telephones 10. Assignment of the directory number upon recyclable cellular telephone 10 activation may be made in accordance with the processes illustrated in FIGS. 7A, 7B and 7C. In such cases, a signal is sent upon recyclable cellular telephone 10 activation from the telephone through the serving base station 172 to the serving mobile switching center 178. The mobile switching center 178 then requests extraction of a directory number from the home location register 184 stored pool of numbers for assignment to the activated recyclable cellular telephone 10. This directory number information is then relayed back through the base station 172 and recyclable cellular telephone 10 to its user. Communication of the assigned directory number to the user may be made in any one of a number of ways including through a voice call made by the mobile switching center 178 to the telephone. The recyclable cellular telephone 10 may then receive, as well as make, cellular telephone calls. The home location register 184 further stores the associated relationships between assigned directory numbers and the electronic serial numbers of activated recyclable cellular telephones 10. This association information, among other information comprising service profiles and locations, is downloaded to the visitor location registers 182 for the mobile switching centers 178 currently serving the activated recyclable cellular telephones 10.

Figure 4B:
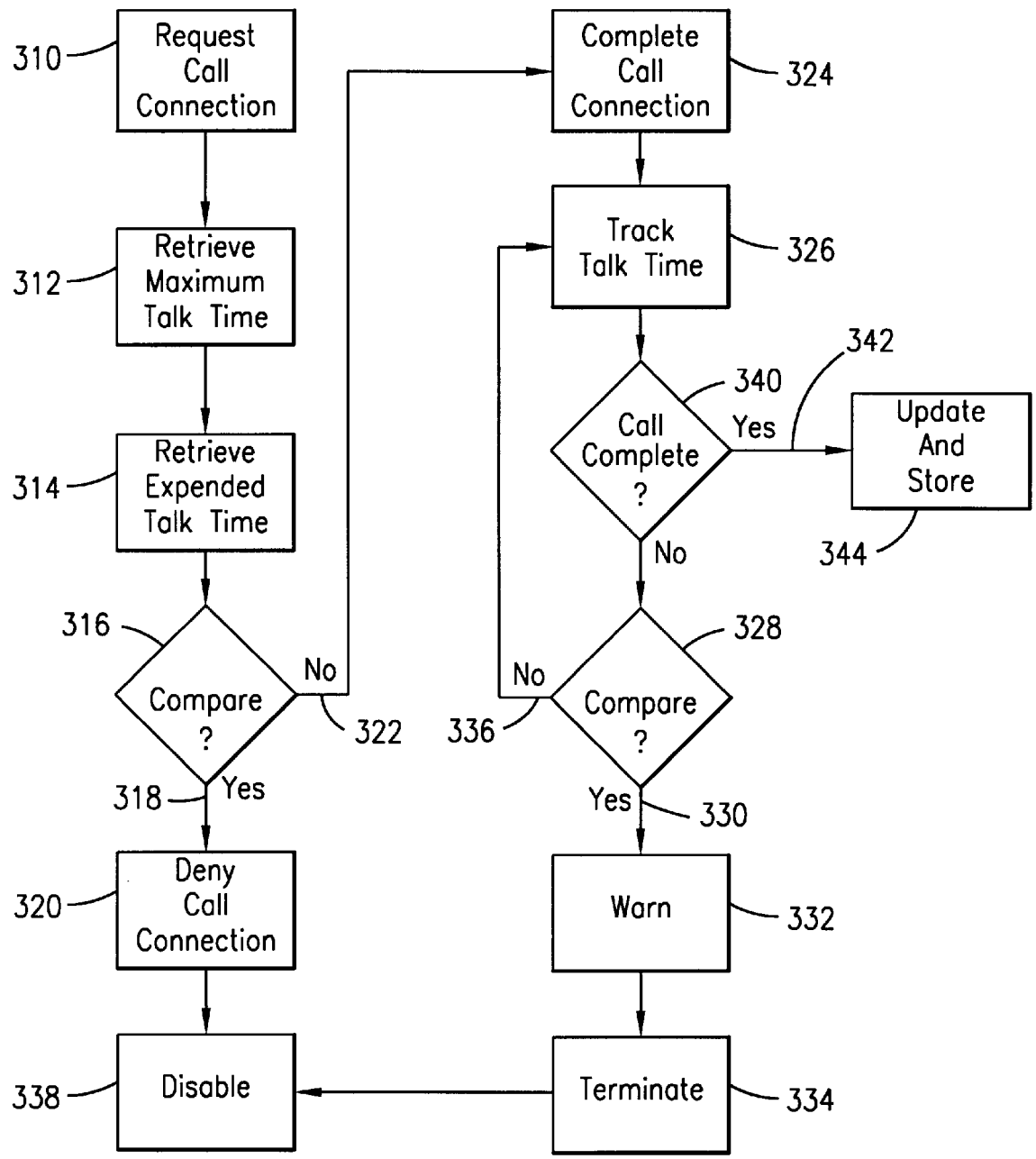
FIG. 4B is a flow diagram illustrating operation of the cellular telephone network in monitoring for the expiration of a pre-set talk-time period of use for a cellular telephone.
Figure 5B:
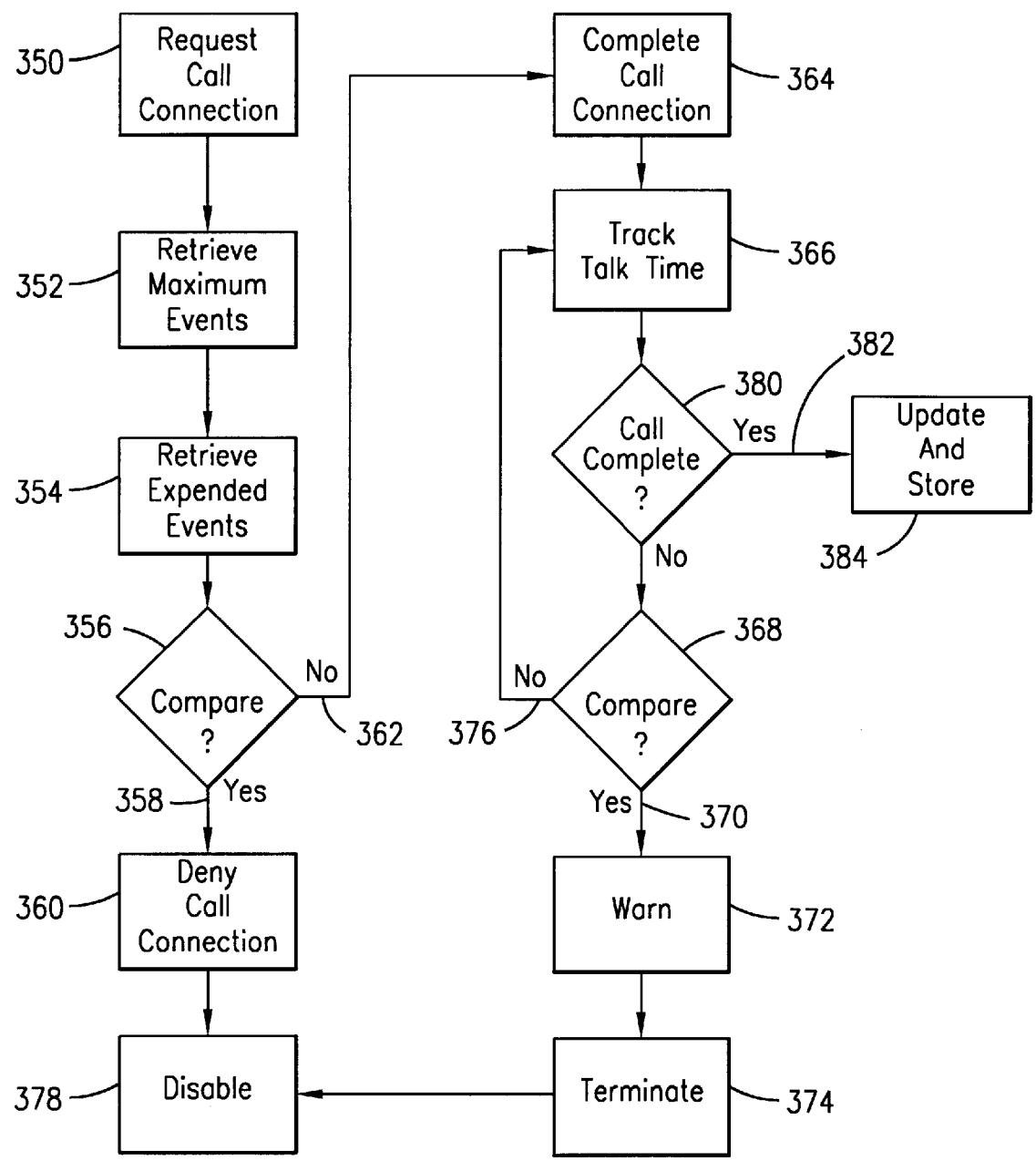
FIG. 5B is a flow diagram illustrating operation of the cellular telephone network in monitoring for the expiration of a pre-set calling event period of use for a cellular telephone.

It has been previously mentioned to have the pre-set period of use for the recyclable cellular telephone 10 stored in its own data storage device 98 (FIG. 3), and have the central processor 92 deactivate and render the telephone inoperable when the period of use is exceeded (FIGS. 4A and 5A). The pre-set period of use and expended use for each recyclable cellular telephone 10 may alternatively be stored in the home location register 184 in association with the assigned directory numbers and the electronic serial numbers. This association information, among other information comprising service profiles and locations, is downloaded to the visitor location registers 182 for the mobile switching centers 178 currently serving the activated recyclable cellular telephones 10. When a call connection (either originating with or terminating at one of the recyclable cellular telephones 10) is requested, the serving mobile switching center 178 retrieves the stored period of use and expended use information for the recyclable cellular telephone at issue from the visitor location register and confirms that expended use has not exceeded the pre-set period of use. The requested call connection is then completed. Again, the pre-set period of use may comprise, for example, talk time or events as previously discussed. Should the mobile switching center 178 determine that the pre-set period of use has been exceeded, however, the requested call connection is ignored, and perhaps instructions are sent to the telephone to initiate a disablement operation. If the requested call connection comprises a user originated call, a message may be given to the user explaining the situation. The comparison of expended use to the pre-set period of use may continue to be monitored during the completed call connection to insure that the pre-set period of use is not subsequently exceeded. If it is so exceeded, a warning may be given to the user, and the call connection is thereafter terminated. At the end of the call connection, the expended use figure is updated and stored in both the visitor location register 182 and the home location register 184. The steps performed on the network side in this regard are illustrated in FIGS. 4B and 5B (described in more detail below).

The customer service and billing center 186 of the telephone network 170 is connected to the home location register 184 data base which stores the associated relationships between assigned directory numbers and the electronic serial numbers of activated recyclable cellular telephones 10. The customer service and billing center 186 comprises a processing unit that manages the activities for adding and removing customers, changing services and billing for cellular service. The processes described earlier in connection with FIGS. 7A, 7B and 7C for assigning directory numbers to recyclable cellular telephones are also managed by the customer service and billing center 186.

Figure 9A:
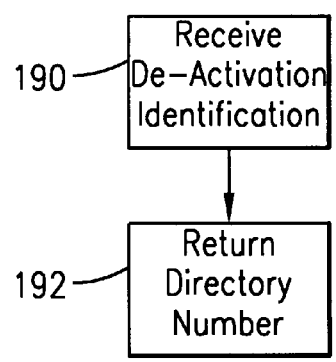
FIGS. 9A, 9B and 9C are flow diagrams for the management process performed in connection with the assignment of directory numbers to recyclable cellular telephones in FIGS. 7A, 7B and 7C, respectively.

Reference is now made to FIG. 9A wherein there is shown a flow diagram for the management process performed by the customer service and billing center 186 in connection with the number assignment embodiment of FIG. 7A wherein directory numbers are assigned for use until deactivated. An identification of a deactivated telephone is received (step 190), and in response thereto the directory number previously assigned to that telephone is returned (step 192) to the pool and made available for subsequent re-assignment to another cellular telephone (see also, step 160 of FIG. 7A).

Figure 9B:
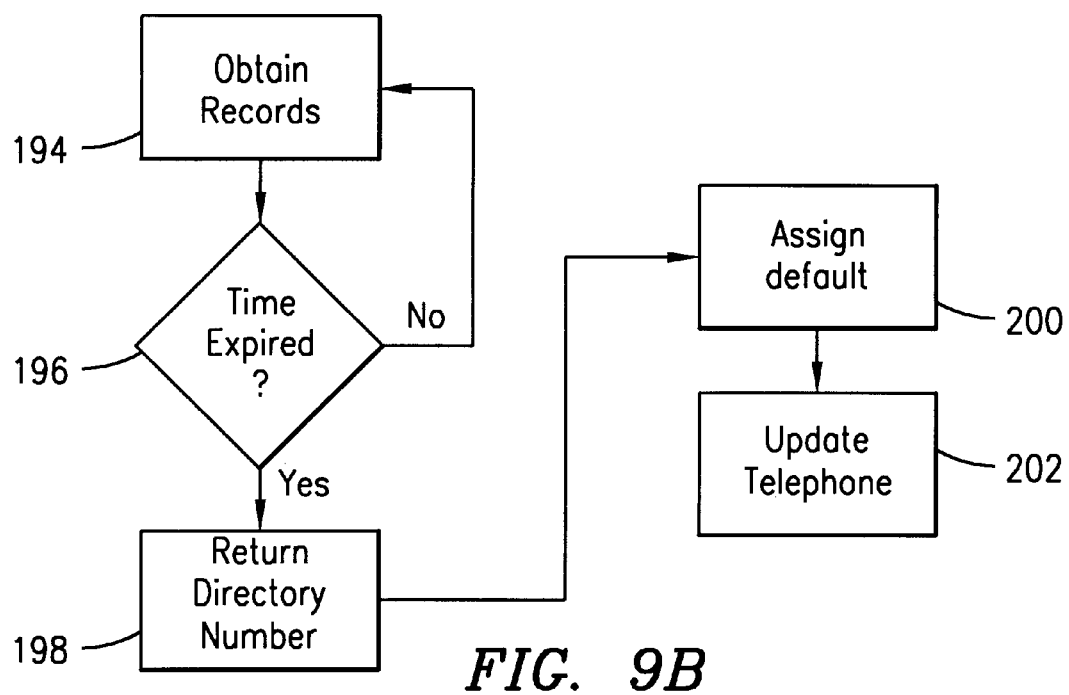

Reference is now made to FIG. 9B wherein there is shown a flow diagram for the management process performed by the customer service and billing center 186 in connection with the number assignment embodiment of FIG. 7B wherein directory numbers are assigned for use for only a predetermined period of time (for example, one month) from the time of initial activation. In either a real time or batch processing job, the customer service and billing center 186 scans the home location register 184 data base to obtain (step 194) the stored records for recyclable cellular telephones. A comparison (step 196) is then made to determine if the predetermined period of time has expired (see also, step 162 of FIG. 7B). If not, the process returns to step 194 to check the record of another telephone. If yes, the assigned directory number is returned (step 198) to the pool and made available for subsequent assignment to another telephone (see also, step 160 of FIG. 7B). A default directory number is then assigned (step 200) to the electronic serial number for the telephone whose predetermined period of time had expired. A signal may also be sent at this time (step 202) instructing the telephone to update its memory to reflect the assignment of the default directory number. This default directory number may not be used in an attempt to place a call to the cellular telephone. Accordingly, from that point in time on (typically until the telephone is deactivated or returned for refurbishment), the telephone may only be used to make calls.

Figure 9C:
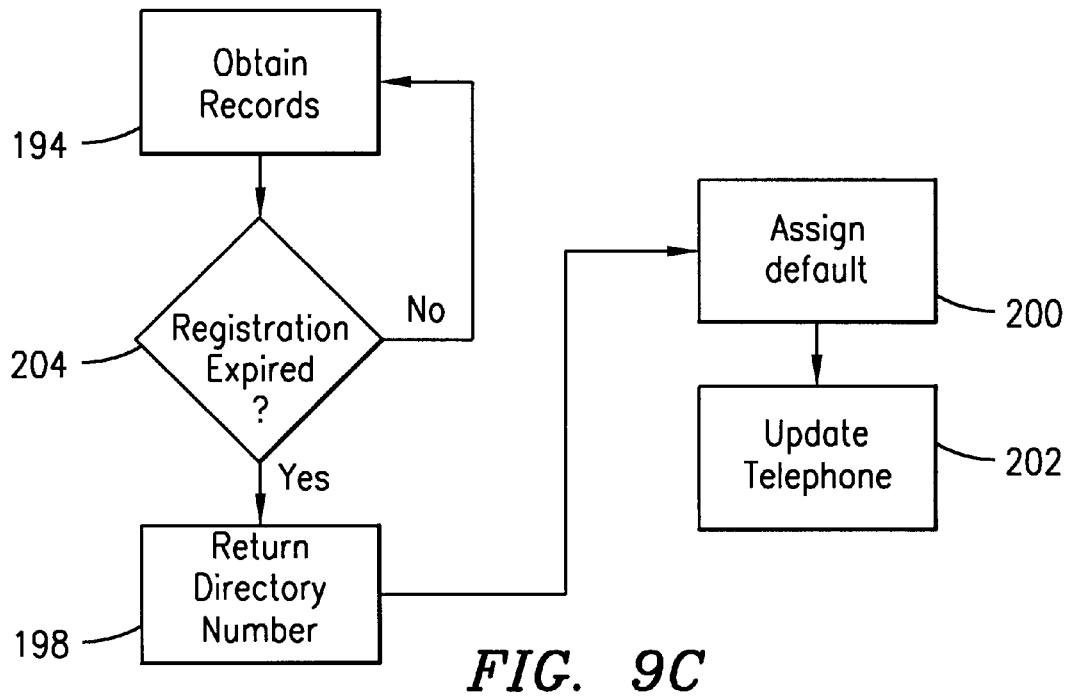

Reference is now made to FIG. 9C wherein there is shown a flow diagram for the management process performed by the customer service and billing center 186 in connection with the number assignment embodiment of FIG. 7C wherein directory numbers are assigned for use for only so long as continued use of the telephone is made. In either a real time or batch processing job, the customer service and billing center 186 scans the home location register 184 data base to obtain (step 194) the stored records for recyclable cellular telephones. A comparison (step 204) is then made to determine if a predetermined period time has expired since the last time the telephone registered with the network 170 (see also, step 164 of FIG. 7C). If no, the process returns to step 194 to check the record of another telephone. If yes, the assigned directory number is returned (step 198) to the pool and made available for subsequent assignment to another telephone (see also, step 160 of FIG. 7C). A default directory number is then assigned (step 200) to the electronic serial number for the telephone whose predetermined period of time had expired. A signal may also be sent at this time (step 202) instructing the telephone to update its memory to reflect the assignment of the default directory number. This default directory number may not be used in an attempt to place a call to the cellular telephone. Accordingly, from that point in time on (typically until the telephone is deactivated or returned for refurbishment), the telephone may only be used to make calls.

Reference is now again made to FIGS. 4A and 5A wherein there are shown flow diagrams illustrating operation of the recyclable cellular telephone 10 in self-monitoring for the expiration of pre-set periods of use. Referring first to FIG. 4A, the amount of time that the cellular telephone 10 is actually engaged in a cellular calling (originating and/or terminating) mode of operation is tracked in step 210. A comparison between the elapsed tracked calling time and predetermined maximum time limit is then made in step 212. If the elapsed time exceeds the maximum time (flow 214), operation of the cellular telephone 10 is disabled in one of several ways. In a first way, the telephone is completely disabled, and thus no outgoing or incoming calls may be made (step 216). Mechanisms for completely disabling the telephone 10 have previously been described. In a second way, the telephone is partially disabled to prevent only incoming calls (step 218). In connection therewith, a default directory number is then assigned (step 220) to the electronic serial number for the telephone. This default directory number may not be used in an attempt to place a call to the cellular telephone. The telephone may continue to be used to place (originate) cellular calls.

Referring next to FIG. 5A, the number of measurable events which occur with respect to the cellular telephone 10 are tracked in step 222. Such events may comprise the origination and/or reception of a cellular telephone call. A comparison between the tracked total number of events and a predetermined maximum number of events is then made in step 224. If the tracked total number of events exceeds the maximum number of events (flow 226), operation of the cellular telephone 10 is disabled in one of several ways. In a first way, the telephone is completely disabled, and thus no outgoing or incoming calls may be made (step 228). Mechanisms for completely disabling the telephone 10 have previously been described. In a second way, the telephone is partially disabled to prevent only incoming calls (step 230). In connection therewith, a default directory number is then assigned (step 232) to the electronic serial number for the telephone. This default directory number may not be used in an attempt to place a call to the cellular telephone. The telephone may continue to be used to place (originate) cellular calls.

Reference is now again made to FIGS. 4B and 5B wherein there are shown flow diagrams illustrating operation of the cellular telephone network in monitoring for the expiration of pre-set periods of use. Referring first to FIG. 4B, when a call connection (originating or terminating) is requested (step 310) for a cellular telephone, the maximum talk-time period of use available to that telephone as well as the currently expended amount of use is retrieved (steps 312 and 314). A comparison is then made in step 316 to determine whether the expended amount meets or exceeds the available amount. If yes (flow 318), the requested call connection is denied in step 320. If no (flow 322), the requested call connection is completed in step 324. During the course of the completed call, the expended amount of time that the cellular telephone 10 is actually engaged in a cellular calling continues to be tracked in step 326. A comparison between the expended tracked calling time and predetermined maximum talk time period is then made in step 328. If the expended time exceeds the maximum time (flow 330), a warning is given to the user in step 332, and the call is thereafter terminated in step 334. If the expended time does not exceed the maximum time (flow 336), the process returns to step 326 to continue tracking time. In connection with the denial of the call connection in step 320 or the termination of a call in step 334, the network may further send an instruction to the cellular telephone in step 338 to initiate a disablement operation in any one of the manners previously described (including the assignment of a default directory number, if appropriate). During an ongoing call, the process further includes the step 340 of monitoring for call completion. At call completion (flow 342), the currently expended amount of use is updated and stored in step 344.

Referring next to FIG. 5B, when a call connection (originating or terminating) is requested (step 350) for a cellular telephone, the maximum number of measurable events available to that telephone as well as the currently expended number of events is retrieved (steps 352 and 354). A comparison is then made in step 356 to determine whether expended number meets or exceeds the maximum number. If yes (flow 358), the requested call connection is denied in step 360. If no (flow 362), the requested call connection is completed in step 364. During the course of the completed call, the expended number of events used by the cellular telephone 10 continues to be tracked in step 366. A comparison between the expended number of events and the predetermined maximum number of events is then made in step 368. If the expended number exceeds the maximum number (flow 370), a warning is given to the user in step 372, and the call is thereafter terminated in step 374. If the expended number does not exceed the maximum number (flow 376), the process returns to step 366 to continue tracking the occurrence of events. In connection with the denial of the call connection in step 360 or the termination of a call in step 374, the network may further send an instruction to the cellular telephone in step 378 to initiate a disablement operation in any one of the manners previously described (including the assignment of a default directory number, if appropriate). During an ongoing call, the process further includes the step 380 of monitoring for call completion. At call completion (flow 382), the currently expended number of events is updated and stored in step 384.

The same default directory number is preferably assigned to all recyclable telephones 10 whose operation has been disabled (restricted) to allow outgoing calls only. The assignment of a default directory number to the electronic serial number for the telephone (in FIGS. 4A, 4B, 5A, 5B, 9B and 9C) insures that the recyclable cellular telephone 10 operates solely in an outgoing call mode as the number is recognized by the network 170 as being an invalid incoming call (but valid outgoing call) directory number. No page of the cellular telephone 10 using its associated electronic serial number are then made in connection with an incoming call dialed to the default directory number.

For cellular telephones configured for operation within an AMPS-type cellular telephone network, the assigned directory number is used during outgoing call set-up. Accordingly, each telephone must have a unique directory number, even when that directory number comprises a default directory number assigned to a telephone whose operation has been disabled (restricted) to allow outgoing calls only. Thus, for AMPS-type cellular telephones, the default directory number assigned to a telephone comprises one of a plurality of unique numbers (other than the unique pool of numbers originally available for assignment to a telephone that the network recognizes as being invalid for handling incoming call connections.

Figure 10:
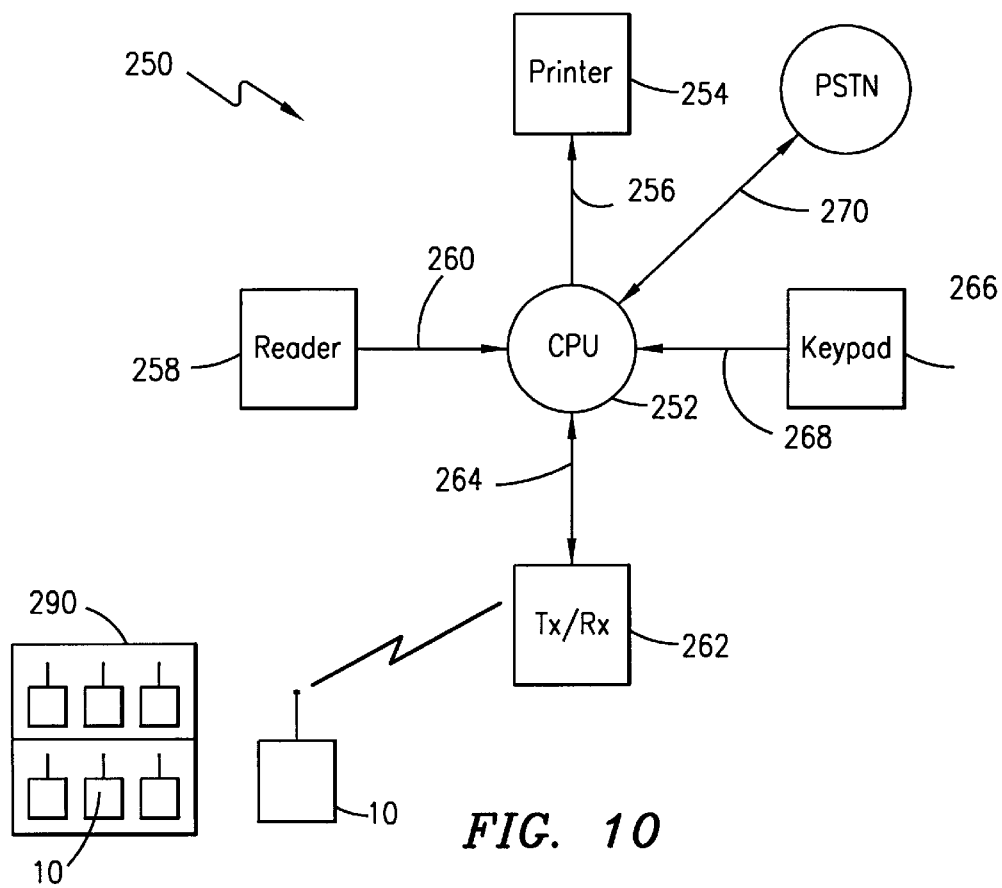
FIG. 10 is a block diagram of an activation/deactivation station for recyclable cellular telephones.

Reference is now made to FIG. 10 wherein there is shown a block diagram of an activation/deactivation station 250 for recyclable cellular telephones 10. The activation/ deactivation station 250 includes a central processing unit (CPU) 252 connected to a printer 254 by communications link 256. The activation/deactivation station 250 further includes a credit card magnetic stripe reader 258 connected to central processing unit 252 by communications link 260. The activation/deactivation station 250 further includes a radio frequency transceiver 262 connected to central processing unit 252 by communications link 264. The activation/deactivation station 250 further includes a data entry device (such as a keyboard or keypad) 266 connected to central processing unit 252 by communications link 268.

To acquire and activate a recyclable cellular telephone 10, a user selects a desired telephone from a self service display rack 290. The telephone 10 is then removed from its packaging, batteries are installed (if necessary), and the telephone is turned on and placed in close proximity to the activation/deactivation station 250 (perhaps within a drawer provided therein). An activation function is then selected through the data entry device 166. The user then swipes his or her credit card through the magnetic stripe reader 258, and the central processing unit 252 obtains the associated credit card number. A call is then placed by the central processing unit 252 over a telephone line 270 to obtain authorization for the charge. Two different types of authorizations may be made: a first for a rental fee for use of the telephone 10 for a predetermined period of time; and, a second for a deposit guaranteeing return of the telephone following the expiration of the predetermined period of time. The second charge is actually billed only if the telephone is not returned. Alternatively, the authorization may be for the outright purchase of the telephone 10. The printer 254 then prints a charge receipt to be kept by the user as a record of the transaction.

Using the radio frequency transceiver 262, the central processing unit 252 communicates with the recyclable cellular telephone 10 to extract its electronic serial number. As an alternative, the transceiver 262 may communicate with the telephone 10 using a hard wire communications link, an infrared communications link or a magnetic coupling communications link. A call is then placed by the central processing unit 252 over telephone line 270 to the customer service and billing center 186 to obtain from a cellular service carrier a directory number for the telephone 10. Alternatively, this call is made utilizing the cellular telephone 10 itself thus obviating the need for a separate communications link 270. The home location register 184 of the serving telephone network 170 then stores the assigned directory number and electronic serial number (see, FIG. 8). The assigned directory number and an identification of the serving cellular system are then downloaded by the central processing unit 252 using the radio frequency transceiver 262 to the telephone 10 for storage in its data storage device 98 (see, FIG. 3). The printer 254 then prints a label with the assigned directory number for reference by the user. Alternatively, the printer 254 may print the number directly on the telephone 10. The telephone 10 may now be used to both make and receive cellular telephone calls.

Figure 11:
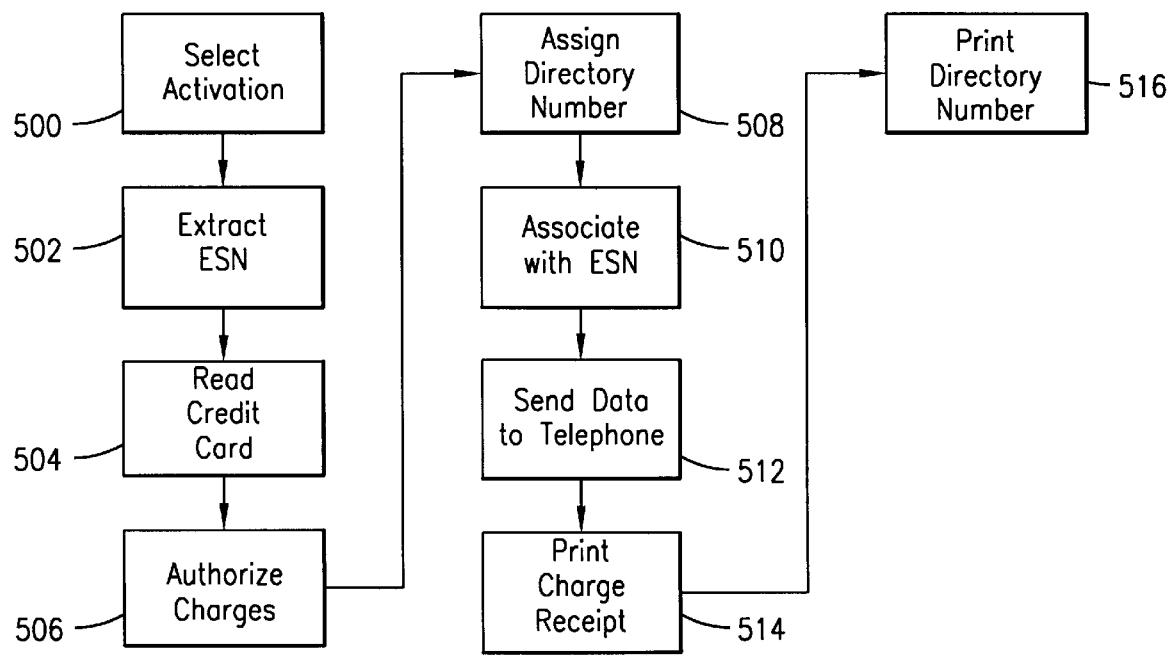
FIG. 11 is a flow diagram of the process for activating a telephone using the activation/deactivation station.

Reference is now additionally made to FIG. 11 wherein there is shown a flow diagram of the process for activating a telephone 10 using the activation/deactivation station 250. In step 500, the activation function is selected. The electronic serial number for the telephone is extracted in step 502. Next, the credit card of the user is read in step 504. Authorization for charges associated with telephone acquisition is then obtained in step 506. Next, in step 508, a directory number for the telephone is assigned, and associated by the network with the extracted electronic serial number (step 510). Appropriate activation data is then sent to the telephone (step 512). The charge receipt and directory number are then printed (steps 514 and 516) for the acquiring user.

The activation/deactivation station 250 further supports the deactivation of recyclable cellular telephones 10. The telephone 10 is placed in close proximity to the activation/deactivation station 250 (perhaps within a drawer provided therein), and a deactivation function selected through the data entry device 266. Using the radio frequency transceiver 262, the central processing unit 252 communicates with the recyclable cellular telephone 10 to extract its electronic serial number, assigned directory number, and system identification. A call is then placed by the central processing unit 252 over telephone line 270 to the customer service and billing center 186 instructing the serving cellular service carrier to disable the assigned directory number. A communication is also made with the telephone 10 instructing it to perform its disable operations (discussed herein), thus rendering the telephone useless unless properly recycled. If necessary, a call is placed by the central processing unit 252 over a telephone line 270 to obtain authorization for any other charges incurred for use of the telephone 10. The printer 254 then prints a receipt summarizing the credit card charges applied for use of the telephone 10 and confirming return of the telephone by the user.

Figure 12:
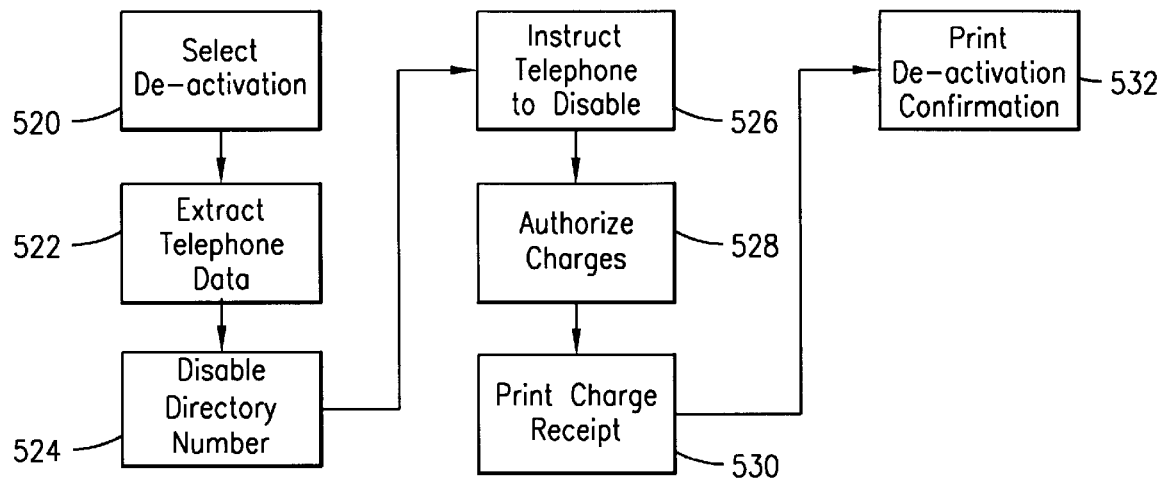
FIG. 12 is a flow diagram of the process for deactivating a telephone using the activation/deactivation station.

Reference is now additionally made to FIG. 12 wherein there is shown a flow diagram of the process for deactivating a telephone 10 using the activation/deactivation station 250. In step 520, the deactivation function is selected. The telephone operation data (for example, electronic serial number, directory number, and system identification) is extracted in step 522. Next, the previously assigned directory number is disabled (i.e., returned to the pool) in step 524. An instruction is then sent in step 526 to the telephone to perform a disablement operation. If necessary, authorization for charges associated with telephone use is then obtained in step 528. Next, the charge receipt and confirmation of deactivation are then printed (steps 530 and 532) for the acquiring user.

Figure 13:
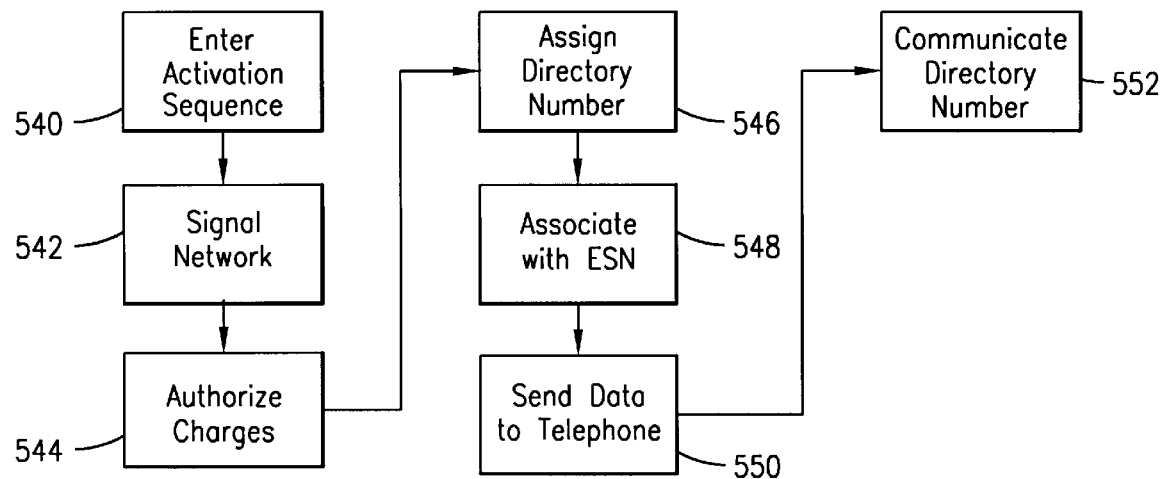
FIG. 13 is a flow diagram for an over-the-air activation process.
Figure 14:
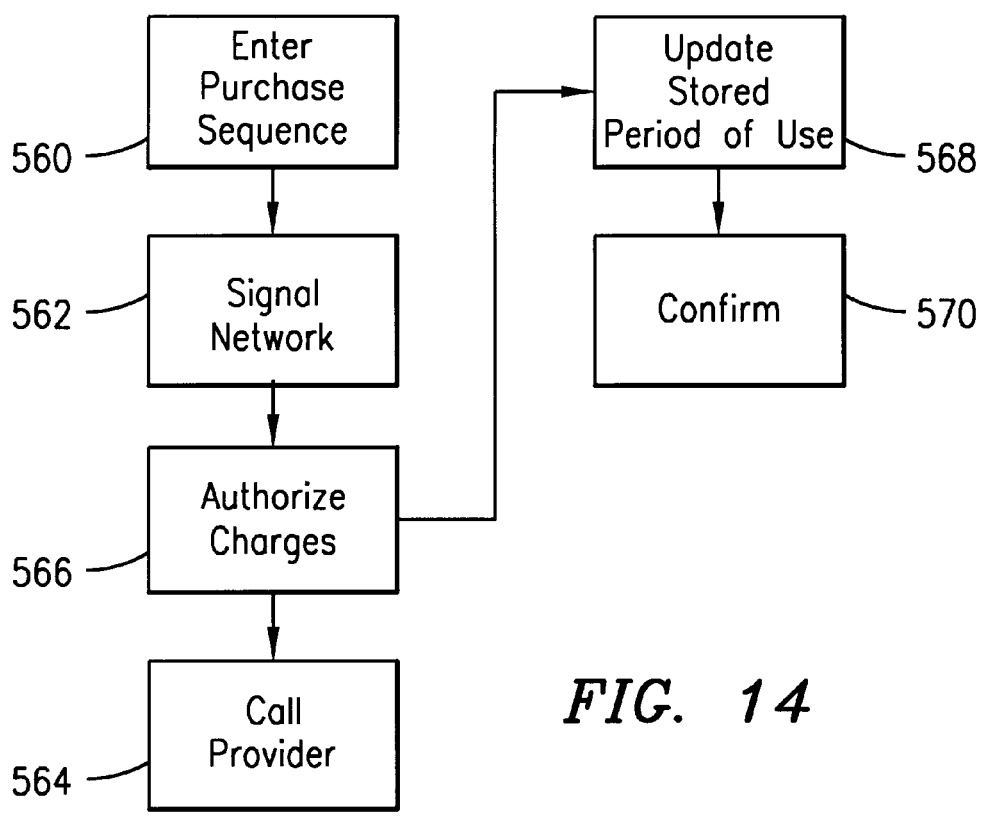
FIG. 14 is a flow diagram for an over-the-air additional period of use purchase process.
Figure 15:
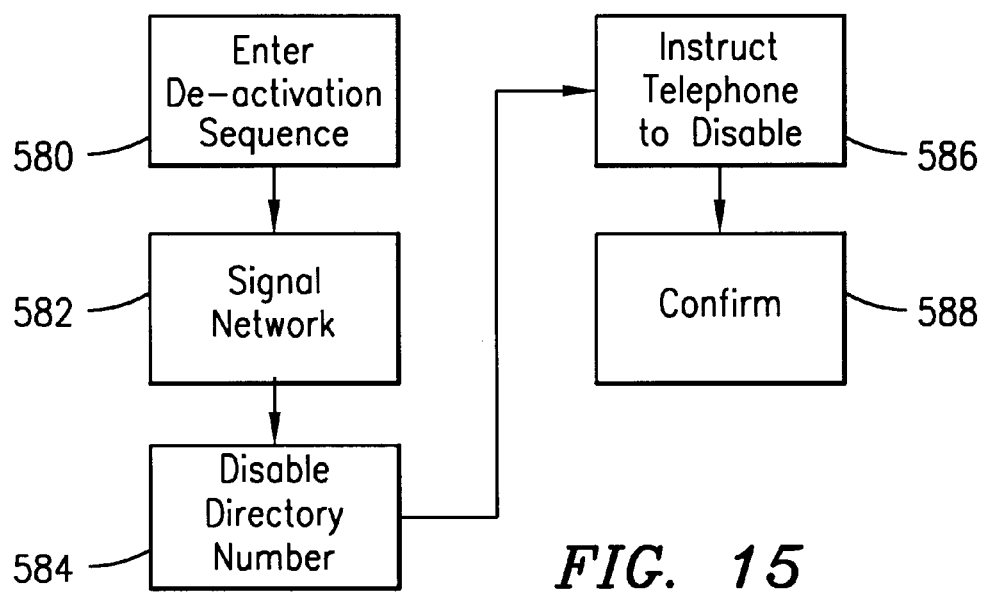
FIG. 15 is a flow diagram for an over-the-air deactivation process.

Reference is now again made to FIGS. 3 and 8, along with the flow diagrams of FIGS. 13, 14 and 15, for a description of over-the-air activation and deactivation methods for the recyclable cellular telephone 10. Turning first to activation, a user selects a desired telephone from a self service display rack 290. The telephone 10 is then removed from its packaging, batteries are installed (if necessary), and the telephone is turned on. A certain button or sequence of buttons on the keypad 70 of the telephone 10 are then pressed by the user. Responsive thereto, a signal is sent from the telephone 10 through the base station 172 to the mobile switching center 178 requesting activation of the telephone. This transmitted signal includes the assigned electronic serial number for the telephone 10. In this case, the telephone 10 is preferably pre-programmed to access only a certain cellular service carrier. A request is then made to obtain from the home location register 184 a directory number for the telephone 10. The assigned directory number is then transmitted back to the telephone for storage in its data storage device 98. For limited feature telephones 10 not having an alphanumeric display, the assigned directory number is communicated to the user by means of an incoming telephone call and an audio message.

FIG. 13 shows a flow diagram for the over-the-air activation process. In step 540, the user enters an activation key sequence (including a function code and a credit card number). A signal is then sent in step 542 through the network including the activation key sequence and the electronic serial number for the telephone. Authorization for charges associated with telephone acquisition is then obtained in step 544. Next, in step 546, a directory number for the telephone is assigned, and associated by the network with the extracted electronic serial number (step 548). Appropriate activation data is then sent to the telephone (step 550). The directory number is then communicated (step 552) to the acquiring user.

Following activation, it may occur that the user exhausts the predetermined period of use for the telephone 10 prior to the point where need to use the telephone ends. With the most limited functionality telephones 10, the user has no option at this point but to acquire another telephone. Alternatively, the user may contact the cellular service provider and acquire over-the-air an additional period of use for the same previously acquired recyclable cellular telephone 10. In one embodiment, the user selects a certain button or sequence of buttons on the keypad 70 of the telephone 10 requesting acquisition of an additional period of use along with entry of the user's credit card number. Responsive thereto, a signal is sent from the telephone 10 through the base station 172 to the mobile switching center 178. This transmitted signal includes the assigned electronic serial number for the telephone 10. A call is placed to obtain authorization for the additional period of use charge. If the period of use is maintained by the home location register, a signal is sent thereto for updating the period of use available to the telephone. If the period of use is maintained in the data storage device 98 of the telephone, on the other hand, a signal is sent back to the telephone 10 through the base station 172. In another embodiment, the user places a call through the telephone 10 to the cellular service provider requesting the additional period of use and providing a credit card number for payment of the associated charge. Following approval of the charge, a signal is sent to either the home location register or the data storage device, as appropriate, for updating the period of use available to the telephone.

FIG. 14 shows a flow diagram for the over-the-air additional period of use purchase process. In step 560, the user enters an purchase key sequence (including a function code and a credit card number). A signal is then sent in step 562 through the network including the purchase key sequence and the electronic serial number for the telephone. In an alternative embodiment, a call is placed by the user to the service provider in step 564 requesting the additional period of use. In either case, authorization for charges associated with the purchase of an additional period of use is then obtained in step 566. Wherever stored, the period of use is updated to reflect the addition in step 568. Confirmation of the purchase is then given to the user in step 570.

Turning next to over-the-air deactivation, once the user has finished using the recyclable cellular telephone 10, perhaps because the period of use has expired, the telephone needs to be deactivated in order to terminate the user's responsibility for charges. The user selects a certain button or sequence of buttons on the keypad 70 of the telephone 10 requesting deactivation. Responsive thereto, a signal is sent from the telephone 10 through the base station 172 to the mobile switching center 178. This transmitted signal includes the assigned electronic serial number for the telephone 10. A signal is then sent to the home location register 184 deleting the assigned directory number. Confirmation of the deactivation is then sent back to the cellular telephone 10. Responsive thereto, the telephone implements actions (discussed above) to disable itself from further use absent authorized recycling.

FIG. 15 shows a flow diagram for the over-the-air deactivation process. In step 580, the user enters a deactivation key sequence (including a function code). A signal is then sent in step 582 through the network including the deactivation key sequence and the electronic serial number for the telephone. Next, the previously assigned directory number is disabled (i.e., returned to the pool) in step 584. An instruction is then sent in step 586 to the telephone to perform a disablement operation. Confirmation of the deactivation is then given to the user in step 588.

Figure 16:
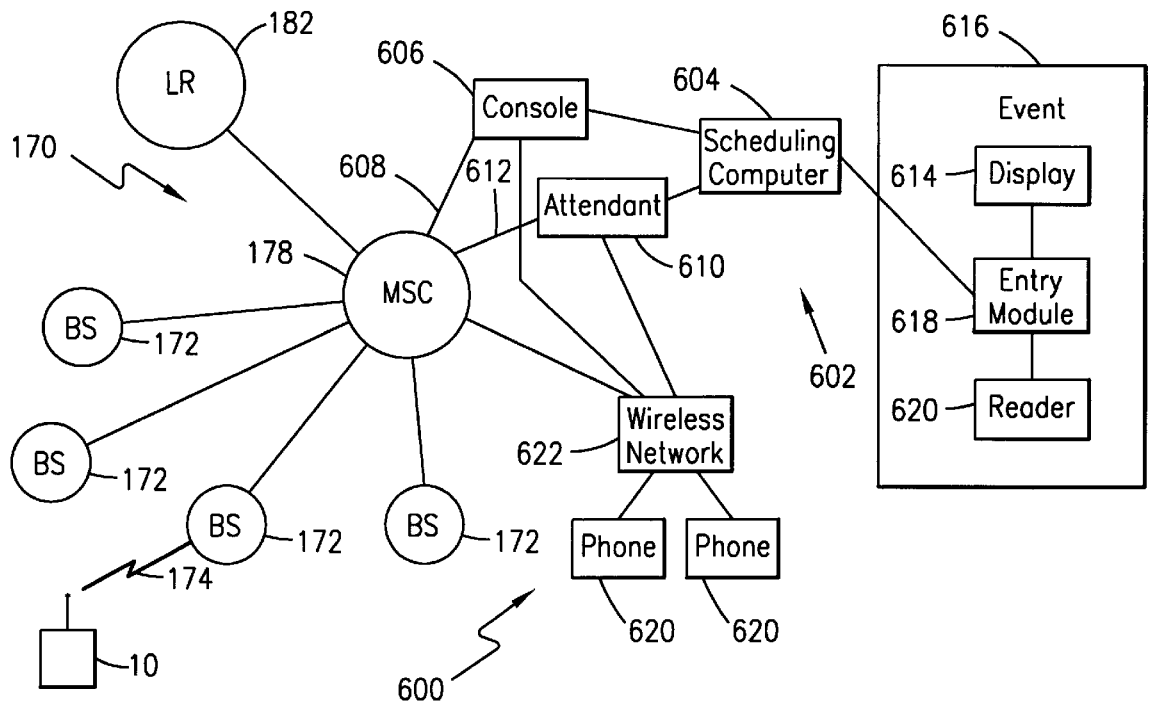
FIG. 16 is a flow diagram for a telephone self deactivation process.

As an alternative to over-the-air deactivation as in FIG. 13, the user selects a certain button or sequence of buttons on the keypad 70 of the telephone 10 requesting deactivation. Responsive thereto, the telephone 10 implements actions (discussed above) to disable itself from further use absent authorized recycling. FIG. 16 shows a flow diagram for the telephone self deactivation process. In step 400, a pre-determined key depression sequence is entered. Next, in decision step 402, a test is made to determine if the entered sequence matches a stored deactivation sequence. If not (flow 404), the telephone continues normal operation. If so (flow 406), the telephone performs its disable function in step 408 which may comprise, for example, changing its operational status bits in memory from activated to deactivated. These bits may only be subsequently changed (to either ready for activation or activated) by an authorized recycling center. An audible tone or message is then generated in step 410 to confirm successful completion of the deactivation process.

Figure 17:
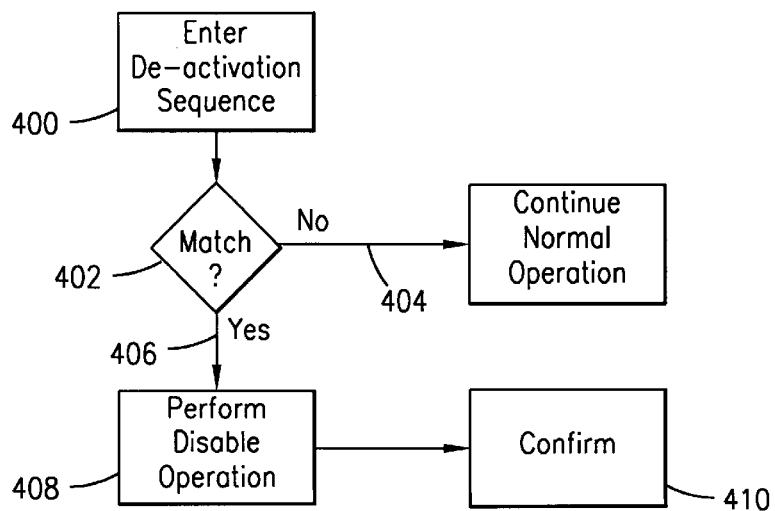
FIG. 17 is a block diagram of a theme park cellular communications and scheduling system of the present invention.

Reference is now made to FIG. 17 wherein there is shown a block diagram of a theme park cellular communications and scheduling system 600 of the present invention. The system 600 includes a limited area cellular telephone network 170 including a plurality of base stations (BS) 172 (only four shown) for effectuating radio frequency communications over an air interface 174 with proximately located recyclable cellular telephones 10. The base stations 172 provide a plurality of microcell and/or picocell communications coverage areas within the park. Each base station 172 is connected through a mobile switching center (MSC) 178 to other mobile switching centers (not shown) within the cellular network 170. The network 170 maintains a record in a location register 182 of recyclable cellular telephone 10 service features, operating parameters and location. Each mobile switching center 178 operates to control associated base station 172 operation. The mobile switching centers 178 further switch within the network 170 cellular telephone calls originated by or terminated at the recyclable cellular telephones 10. Operation of the network 170 in this fashion is well known to those skilled in the art, and thus further description will not be provided.

In this application, cellular telephones 10 of the present invention are sold (leased) to patrons of the attraction, especially in connection with group or family visits, allowing the purchasers to contact other similarly sold cellular telephones within the confines of the attraction. Thus, a family could split into two groups, purchase two cellular telephones 10, and communicate with each other throughout the day, for example, to arrange meetings for meals and departure. At the end of the visit to the attraction, the telephones 10 are left for refurbishment and use by another customer the next day, and the previous customer receives a return of their deposit. For an additional cost, certain ones of the telephones 10 could be provided with access rights to a public cellular telephone network or to the public switched telephone network to make external to the attraction calls.

The system 600 further includes an event scheduling system 602 connected to at least one of the mobile switching centers 178. The event scheduling system 602 includes a scheduling computer 604 which maintains a record of all events within the park as well as schedules times for patron visits to such events. Manual input into the scheduling computer 604 of patron requests for scheduling visits to events may be made through console 606 by an operator having a telephone voice circuit 608 access to the mobile switching center 178. Alternatively, an automated attendant system 610, connected by a voice circuit 612 to the mobile switching center 178 is used to process patron requests to scheduled for access to an event. Both the console 606 and the automated attendant system 610 are connected to the scheduling computer 604.

At each event 616 within the park, an entry module 618 is provided to screen patrons for access. The entry module 618 is connected to the scheduling computer 604, and is connected to a display screen 614 for display to park personnel patron access scheduling, park operation, and loading information. This information is important to the park personnel in order to appropriately and efficiently grant access to the event, especially with respect to those patrons who do not schedule a particular time, but prefer instead to wait in line. The entry module 618 is further connected to a identification reader 620 to determine an identity of each patron desiring access to the particular associated event. In one embodiment, each patron is provided with a tag including a unique bar coded identification number. In another embodiment, each patron is identified by their recyclable cellular telephone 10 identification number. In a third embodiment, each patron is identified by means of a unique identification number which is communicated by means of an infrared or magnetic communications link established with the cellular telephone 10. This infrared communications link may further be used to communicate with the cellular telephone in connection with the registration and activation process. In each case, the identification number is read by the reader 620 and communicated by the entry module 618 to the scheduling computer 604. If the patron associated with the read identification number has previously made a request for and is scheduled for access to the event at that time, the scheduling computer 604 sends a confirmation message and the entry module 618 appropriately signals event personnel, perhaps through the display 614, to permit patron access. Otherwise, based on availability and loading constraints, access to the event is made on a first come first served basis.

The scheduling computer 604 further tracks by identification number the frequency with which patrons request scheduled entry to events. The park may impose a restriction on the number of times per day a patron may schedule a visit to a particular event. Responsive then to a patron request in excess of the restricted amount, the request for a scheduled time is denied.

Unless a telephone 10 is given to each patron (purchase included with the cost of admission), many patrons will choose not to take advantage of the calling benefits of the network 170. To give these patrons access to the advantages provided from the use of the scheduling computer 604, a number of fixed line telephones 620 are positioned throughout the park. Using a fixed wireline communications network 622, these telephones are connected to the event scheduling system 602, and in particular to the scheduling computer 604, through the operator console 606 or automated attendant 610.

Figure 18A:
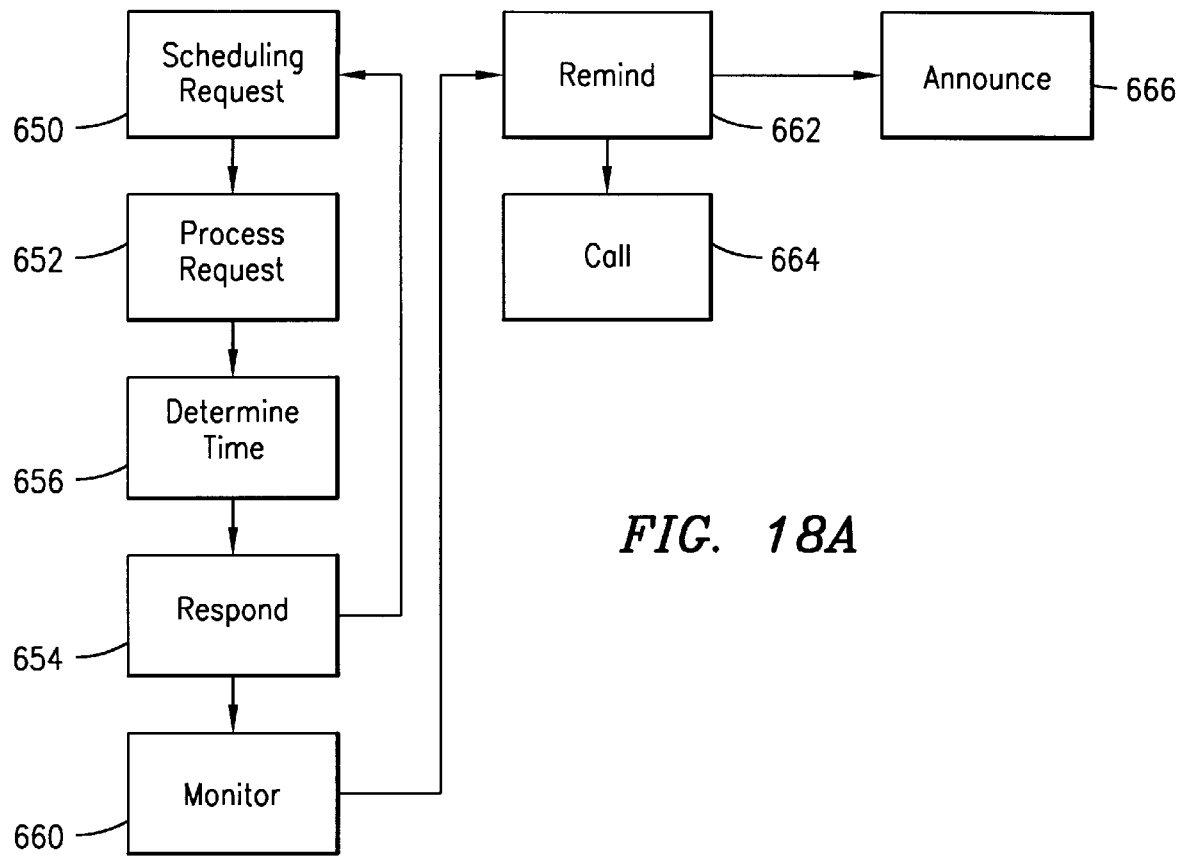
FIGS. 18A and 18B are flow diagrams illustrating the scheduling process and entry acceptance process performed by the system of FIG. 17.

Reference is now made to FIG. 18A wherein there is shown a flow diagram illustrating the scheduling process performed by the system of FIG. 17. In step 650, a patron scheduling request is received. This request identifies a particular event, and may further specify a time or time range for the requested visit. The request is processed in step 652, and a response is provided to the patron in step 654. The processing of the request involves the determination in step 656 of a particular scheduled time for the patron visit to the specified event. The response given to the patron in step 654 includes a confirmation of the scheduled time or an indication that the request is denied. Denial may occur, for example, if the patron has previously requested more than a fixed number of schedules visits to the event. Alternatively, denial may occur if the particular requested time cannot be accommodated. In such a case, the response of step 654 may include a request for an alternate time, or an indication of available times for patron selection using a subsequently entered request (see, again, step 650).

Following the scheduling of various patrons to visit a particular event, monitoring of the present time and the established schedule is made in step 660. When appropriate, for example, within ten to fifteen minutes of the scheduled time for the visit, an attempt is made in step 662 to remind the patron of the schedule. This reminder is preferably made by calling those patrons scheduled for a visit using the cellular telephones in step 664. Alternatively, at the site of the event, an aural or visual announcement is made in step 666, perhaps giving a particular group number, to remind those present of upcoming scheduled event access. Preferably, the patron is given the group number in connection with the confirmation response of step 654.

Figure 18B:
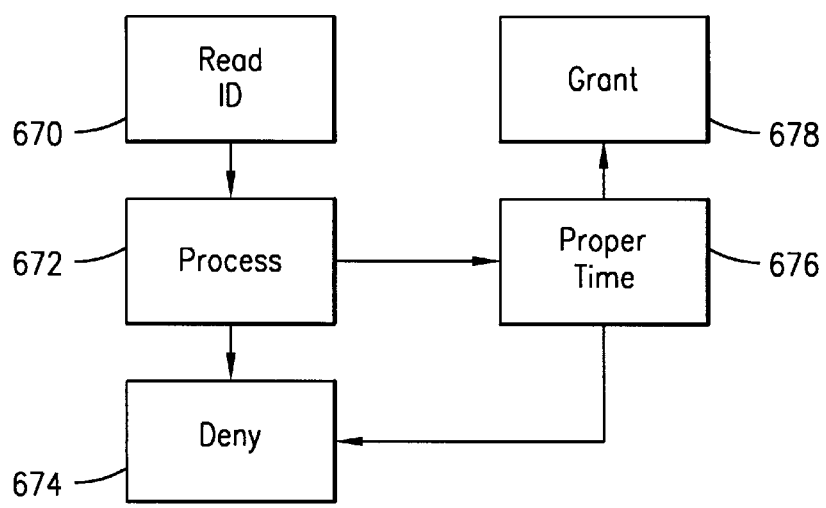

Reference is now made to FIG. 18B wherein there is shown a flow diagram illustrating the entry acceptance process performed by the system of FIG. 17. It is now assumed that a patron has been scheduled to visit a particular event. In step 670, an identification number associated with each patron attempting to gain access to an event is read. The read identification number is then processed in step 672 to determine whether that patron has scheduled a visit to the event. If not, scheduled access in accordance with the present invention is denied in step 674. If yes, a determination is made in step 676 if the patron has arrived at the proper time for entry in accordance with the scheduled visit. If not, scheduled access in accordance with the present invention is denied in step 674. If yes, scheduled access in accordance with the present invention is granted in step 678.

Although embodiments of the method and apparatus of the present invention have been illustrated in the accompanying Drawings and described in the foregoing Detailed Description, it will be understood that the invention is not limited to the embodiments disclosed, but is capable of numerous rearrangements, modifications and substitutions without departing from the spirit of the invention as set forth and defined by the following claims.

What is claimed is:

1. A park event scheduling system, comprising:

a scheduling computer responsive to patron scheduling requests to visit a certain event by assigning the requesting patron a visit time at the certain event, and responsive to an event access request for confirming patron scheduled admission to the event;

a reader at the certain event for reading an identification of each patron attempting to access the event;

an entry module at the certain event connected to the reader and the scheduling computer, the entry module transmitting the event access request including the read patron identification to the scheduling computer for processing, and receiving from the scheduling computer a confirmation of patron scheduled admission to the event and granting admission to the identified patron in response thereto; and a wireless communications system within the confines of the park through which patrons may communicate scheduling requests to visit a certain event.

2. The park event scheduling system as in claim 1 further including a voice circuit connection between the scheduling computer and the wireless communications system to enable a reminder call concerning the scheduled visit time at the certain event to be made by the patron.

3. The park event scheduling system as in claim 2 wherein the communications system comprises a wireline telephone communications system.

4. The park event scheduling system as in claim 1 further including an automated attendant system connected to the communications system and to the scheduling computer for receiving and processing communications system transmitted scheduling requests to visit a certain event.

5. The park event scheduling system as in claim 1 further including means at the certain event for making an audible or visual reminder concerning the scheduled visit time at the certain event to be made by the patron.

6. The park event scheduling system as in claim 1 wherein the reader includes means for establishing an infrared or magnetic communication link with a cellular telephone carried by the patron to obtain patron identification.

7. A park event scheduling system, comprising:

a cellular type radio communication system; and a cellular radio telephone operable within the cellular type radio communications system through which a patron may make a reservation to attend a park event at a future time.

8. The system as in claim 7 further comprising a reservations center connected to the communications system to receive the reservation and to authorize patron attendance at the park event.

9. The system as in claim 8 further comprising means for providing a reminder to the patron of the reservation to attend the park event.

10. A park event scheduling system, comprising:

a wireline telephone communications system; and a wireline telephone operable within the wireline telephone communications system through which a patron may make a reservation to attend a park event at a future time.

11. The park event scheduling system of claim 10 further comprising a reservations center connected to the communications system to receive the reservation and to authorize patron attendance at the park event.

12. The park even scheduling system of claim 10, further comprising means for providing a reminder to the patron of the reservation to attend the park event.

* * * * *